United States Patent
Kitaya et al.

(10) Patent No.: US 10,225,460 B2
(45) Date of Patent: Mar. 5, 2019

(54) ELECTRONIC DEVICE AND METHOD OF CONTROLLING THE SAME

(71) Applicant: CANON KABUSHIKI KAISHA, Tokyo (JP)

(72) Inventors: Koki Kitaya, Kawasaki (JP); Takashi Yoshimi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/685,315

(22) Filed: Aug. 24, 2017

(65) Prior Publication Data

US 2018/0063419 A1    Mar. 1, 2018

(30) Foreign Application Priority Data

Aug. 31, 2016 (JP) .................. 2016-169619
Aug. 31, 2016 (JP) .................. 2016-170063

(51) Int. Cl.
  *H04N 5/232*    (2006.01)

(52) U.S. Cl.
  CPC ..... *H04N 5/23216* (2013.01); *H04N 5/23245* (2013.01); *H04N 5/23293* (2013.01)

(58) Field of Classification Search
  CPC .................................. H04N 5/23216
  USPC .................................... 348/333.02
  See application file for complete search history.

(56) References Cited

U.S. PATENT DOCUMENTS

2011/0149095 A1* 6/2011 Kikuchi ............ H04N 5/23248
  348/208.4
2013/0278789 A1* 10/2013 Yasuda ................ H04N 5/232
  348/222.1

FOREIGN PATENT DOCUMENTS

JP    2007-163773 A    6/2007

* cited by examiner

*Primary Examiner* — Joel W Fosselman
(74) *Attorney, Agent, or Firm* — Venable LLP

(57) ABSTRACT

An electronic device includes a first operation member for changing a set value of an allocated function item, and a second operation member for changing a function item allocated to the first operation member, and registers a set of function items to be allocated to the first operation member. The set includes a standard function that is allocated to the first operation member before the second operation member is operated, and the electronic device controls switching among function items to be allocated to the first operation member based on whether the standard function is an invalid function and on the number of function items included in the registered set, the switching being performed in response to an operation performed on the second operation member, the invalid function disabling changing of the set value by the first operation member.

29 Claims, 15 Drawing Sheets

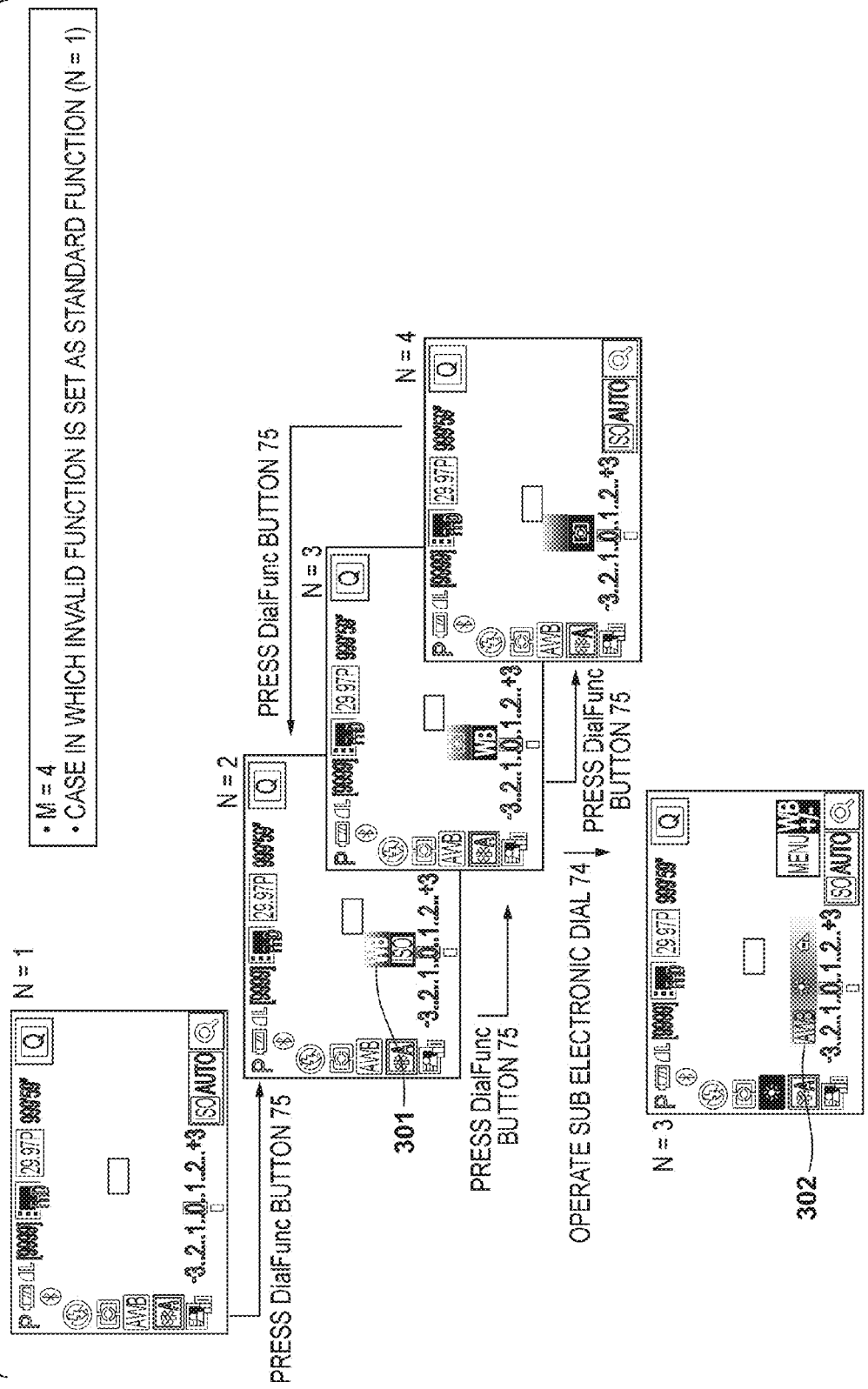

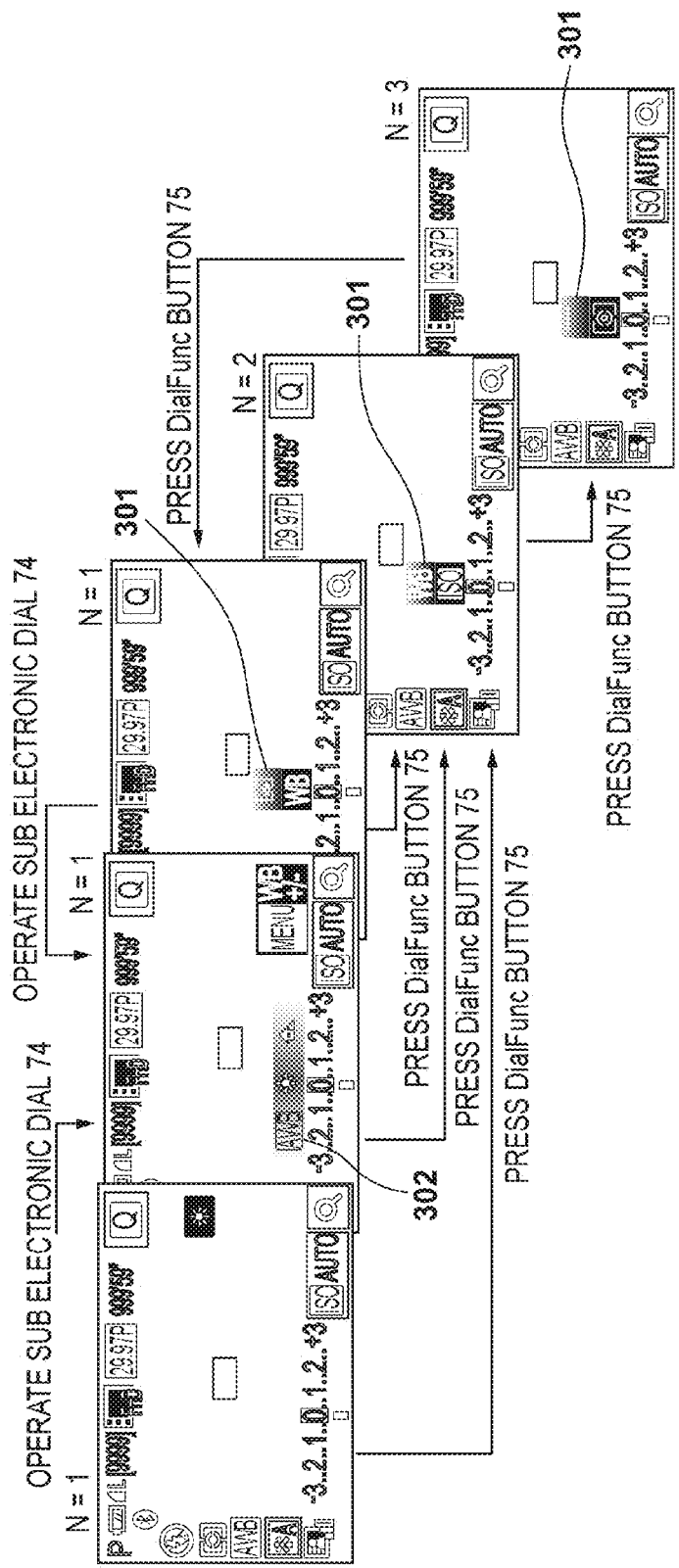

FIG. 5A-a
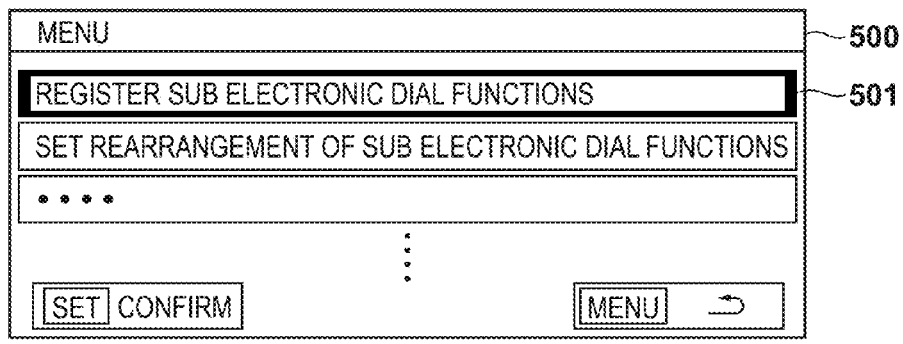
FIG. 5A-b
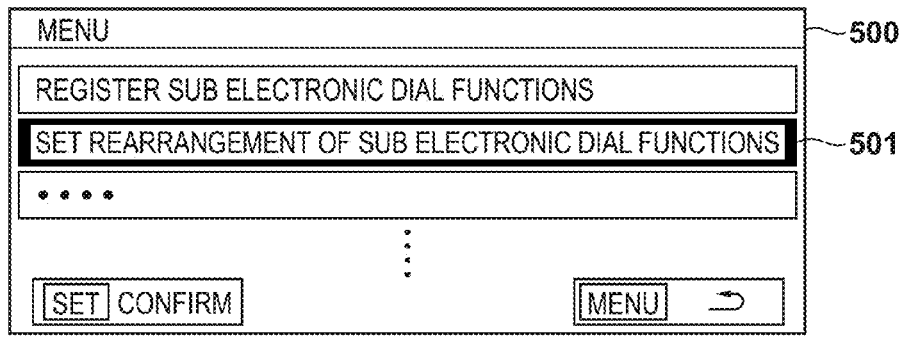
FIG. 5A-c
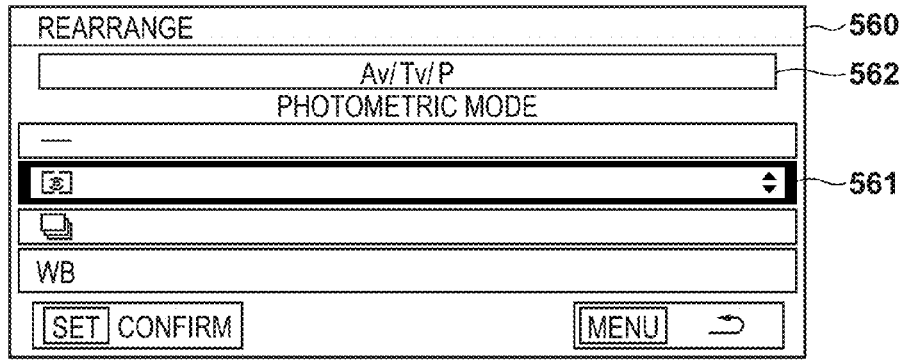
FIG. 5A-d
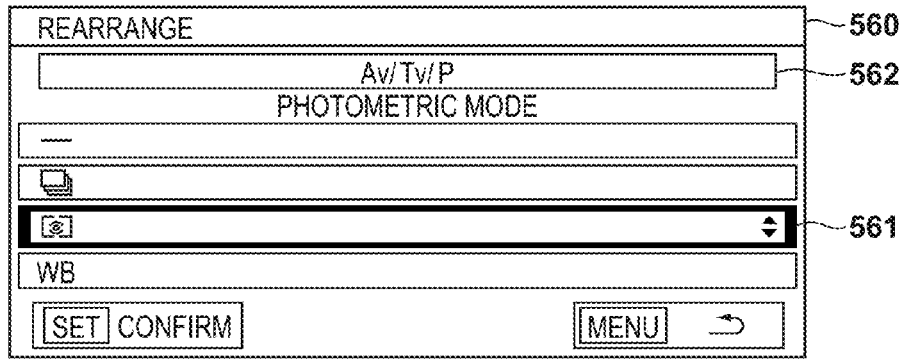

FIG. 5B-a
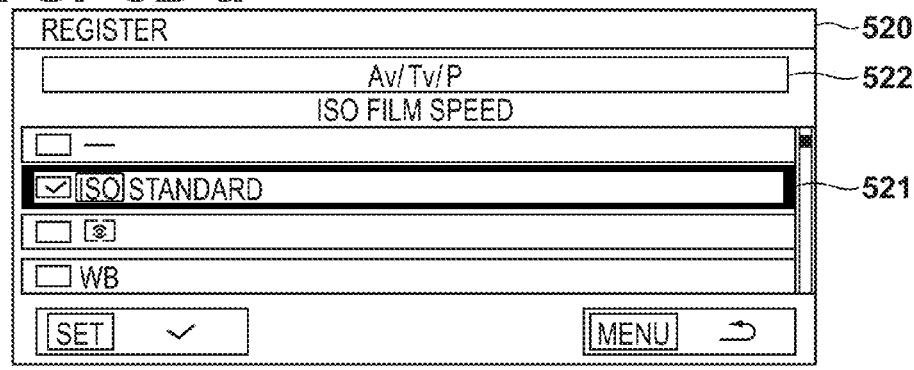
FIG. 5B-b
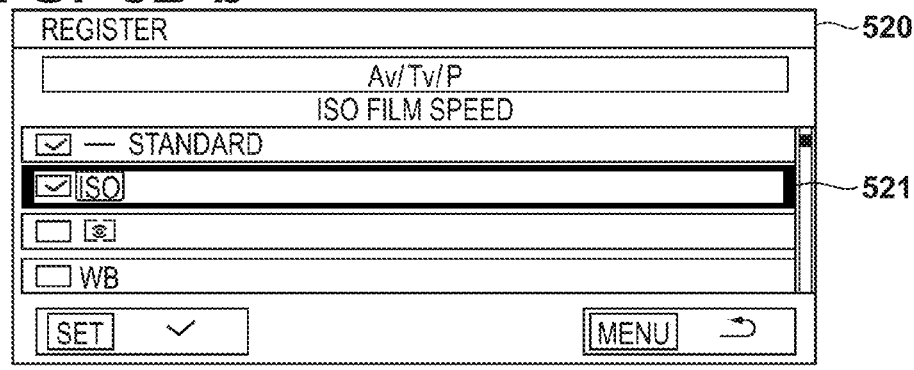
FIG. 5B-c
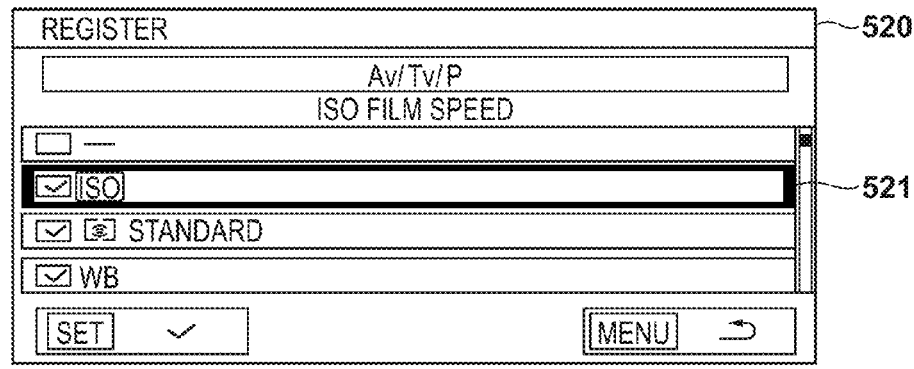
FIG. 5B-d
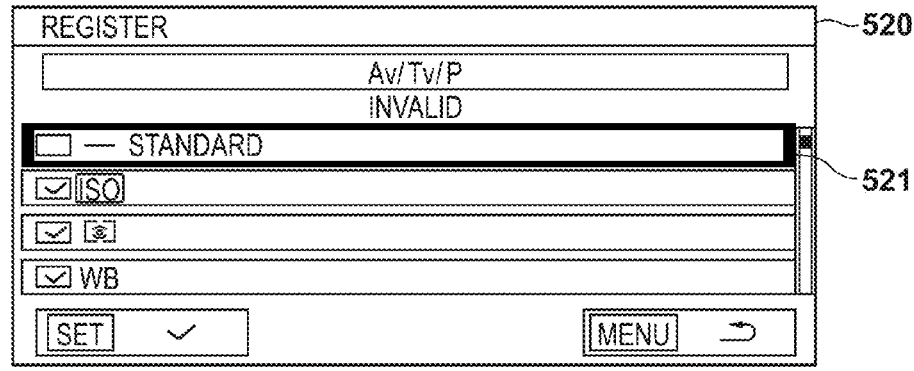

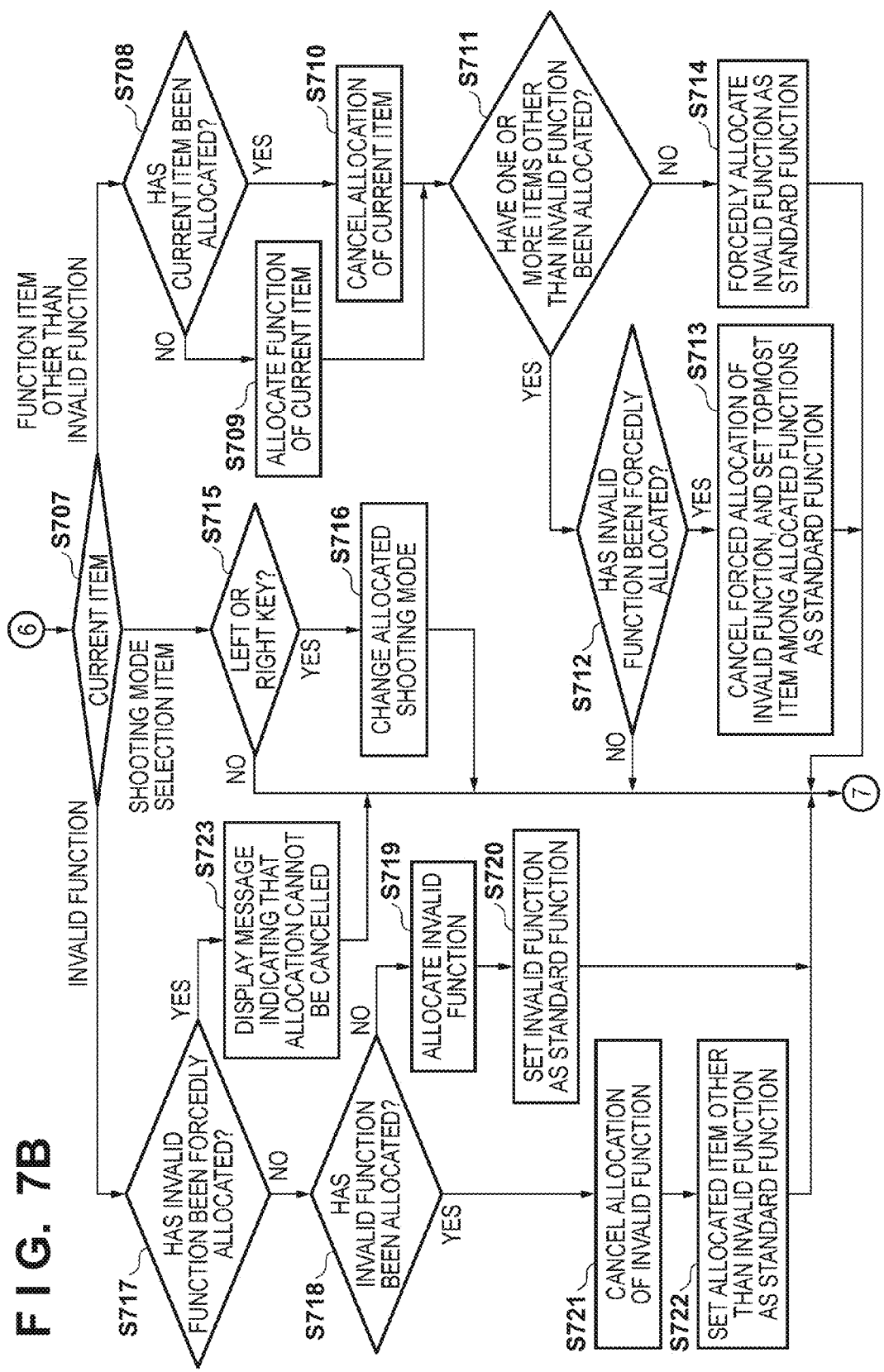

ELECTRONIC DEVICE AND METHOD OF CONTROLLING THE SAME

BACKGROUND OF THE INVENTION

Field of the Invention

The present invention relates to an electronic device, a method of controlling the same, a program, and a recording medium.

Description of the Related Art

In order to produce photographs as intended by a user, a digital camera generally shoots images based on set values of various types of shooting-related function items (f-number, shutter speed, ISO film speed, white balance, and so forth) that have been set by the user. These set values of function items are changed using setting functions provided by, for example, button switches, dials, and similar operation members provided on the camera, and a menu on a display screen. If one function item is allocated to one operation member, the number of operation members increases as the number of set function items increases; this causes an increase in the size of the camera body and a cost increase. In view of this, in general, settings of a plurality of function items can be configured using one operation member. In this case, a user selects a function item to be set from among a plurality of function items, allocates the selected function item to an operation member, and performs a setting operation.

Japanese Patent Laid-Open No. 2007-163773 (hereinafter, "Document 1") suggests a camera that switches among functions to be allocated to a button switch in accordance with the result of detection of contact between an eyepiece viewfinder and an eye. According to Document 1, when contact between the eyepiece viewfinder and the eye has been detected, a plurality of buttons on the camera have a single function, and the camera switches among items for which a parameter is to be set each time an arbitrary button operation is performed. On the other hand, when contact between the eyepiece viewfinder and the eye has not been detected, items to be set are allocated in one-to-one correspondence to the plurality of buttons, and pressing an arbitrary button will enable setting of a parameter of the corresponding item to be set, that is, the item allocated to the pressed button.

In some configurations, set values related to a plurality of function items can be changed using a single operation member; Document 1 describes one example of such configurations, specifically, a configuration that switches sequentially among function items to be set in response to an operation performed on a switching operation member. Set values of function items to be set are changed by operating a setting operation member for changing the set values. In this case, a user who wants to make full use of numerous function items can experience improved convenience by registering function items that are frequently changed by the user and customizing the settings so as to switch a function item allocated to the setting operation member among the registered function items. However, depending on the position at which the setting operation member is arranged, there is a possibility that a set value is accidentally changed by accidental contact with the setting operation member. Therefore, a user who wants to place priority on prevention of accidental operations can experience improved convenience if the user can customize the settings that enable the use of the registered function items without accidental operations. In view of this, there is demand for a highly usable customizing function that meets a variety of customization requirements.

When a plurality of function items are registered by customization, a user is likely to have an intention to switch sequentially among function items allocated to the setting operation member. In this case, the feeling of performing an operation to "switch among setting items" can be provided, as desired by the user, by selecting a function item allocated to the setting operation member sequentially from among the plurality of registered function items in response to an operation performed on the switching operation member. On the other hand, when one function item is registered, the user can change only a set value of that setting item using the setting operation member. In this case, even if the user operates the switching operation member, a state in which the same function item is allocated to the setting operation member is maintained. Thus, the user may feel a sense of discomfort because no change occurs regardless of the user's operation on the switching operation member.

SUMMARY OF THE INVENTION

Embodiments have been conceived in view of the foregoing issues, and disclose an electronic device that provides a favorable feeling of performing an operation regardless of the number of registered function item to be allocated to an operation member, and a method of controlling the same.

The embodiments also disclose an electronic device that realizes a highly usable customizing function that meets a variety of customization requirements, and a method of controlling the same.

According to one aspect of the present invention, there is provided an electronic device, comprising: a first operation member configured to change a set value of an allocated function item; a second operation member configured to change a function item allocated to the first operation member; a registering unit configured to register a set of function items to be allocated to the first operation member, the set including a standard function that is allocated to the first operation member before the second operation member is operated; and a control unit configured to control switching among function items to be allocated to the first operation member based on whether the standard function is an invalid function and on the number of function items included in the registered set, the switching being performed in response to an operation performed on the second operation member, the invalid function disabling changing of the set value by the first operation member.

According to another aspect of the present invention, there is provided an electronic device, comprising: a first operation member configured to change a set value of an allocated function item; a second operation member configured to change a function item allocated to the first operation member; a registering unit configured to register a set of function items to be allocated to the first operation member, the set including an invalid function as a function that is allocated to the first operation member before the second operation member is operated, the invalid function disabling changing of the set value by the first operation member; and a control unit configured to perform control to when the registered set includes only the invalid function and another function item, switch a function allocated to the first operation member alternately between the invalid function and the another function item in response to an operation performed on the second operation member, and when the registered set includes the invalid function and two or more other function items, switch a function allocated to the first operation member sequentially among the two or more function items, from one function item to another, in response to an operation performed on the second operation member.

According to another aspect of the present invention, there is provided a method of controlling an electronic device including a first operation member configured to change a set value of an allocated function item, and a second operation member configured to change a function item allocated to the first operation member, the method comprising: registering a set of function items to be allocated to the first operation member, the set including a standard function that is allocated to the first operation member before the second operation member is operated; and controlling a way of switching among function items to be allocated to the first operation member based on whether the standard function is an invalid function and on the number of function items included in the registered set, the switching being performed in response to an operation performed on the second operation member, the invalid function disabling changing of the set value by the first operation member.

According to another aspect of the present invention, there is provided a method of controlling an electronic device including a first operation member configured to change a set value of an allocated function item, and a second operation member configured to change a function item allocated to the first operation member, the method comprising: registering a set of function items to be allocated to the first operation member, the set including an invalid function as a function that is allocated to the first operation member before the second operation member is operated, the invalid function disabling changing of the set value by the first operation member; and performing control to when the registered set includes only the invalid function and another function item, switch a function allocated to the first operation member alternately between the invalid function and the another function item in response to an operation performed on the second operation member, and when the registered set includes the invalid function and two or more other function items, switch a function allocated to the first operation member sequentially among the two or more function items, from one function item to another, in response to an operation performed on the second operation member.

According to another aspect of the present invention, there is provided an electronic device, comprising: a first operation member; a second operation member; a registering unit configured to be able to register one of a plurality of functions or an invalid function as a standard function of the first operation member in response to a user operation, and register at least one of the plurality of functions as a temporary function of the first operation member in response to a user operation; and a control unit configured to when the first operation member has been operated before the second operation member is operated, if a function other than the invalid function is registered as the standard function, perform control to execute the function registered as the standard function, whereas if the invalid function is registered as the standard function, perform control to execute no function in response to the operation performed on the first operation member, and when the first operation member has been operated after the second operation member is operated, perform control to execute a function registered as the temporary function.

According to another aspect of the present invention, there is provided a method of controlling an electronic device including a first operation member and a second operation member, the method comprising: registering one of a plurality of functions or an invalid function as a standard function of the first operation member in response to a user operation; registering at least one of the plurality of functions as a temporary function of the first operation member in response to a user operation; when the first operation member has been operated before the second operation member is operated, if a function other than the invalid function is registered as the standard function, executing the function registered as the standard function, whereas if the invalid function is registered as the standard function, executing no function in response to the operation performed on the first operation member; and when the first operation member has been operated after the second operation member is operated, executing a function registered as the temporary function.

Further features of the present invention will become apparent from the following description of exemplary embodiments (with reference to the attached drawings).

BRIEF DESCRIPTION OF THE DRAWINGS

FIGS. 3A to 3C show examples of transitions that are made on a setting changing screen by pressing a DialFunc button.

FIGS. 4A-1, 4A-2, 4B and 4C are flowcharts showing processing in a still image mode.

FIGS. 5A-a to 5A-d show a MENU screen and a function rearranging screen.

FIGS. 5B-a to 5B-d show a function registering screen.

FIGS. 7A and 7B are flowcharts showing function registering processing.

DESCRIPTION OF THE EMBODIMENTS

The following describes a preferred embodiment of the present invention with reference to the attached drawings. Note that the embodiment described below pertains to an example in which an electronic device according to the present invention is applied to an image capturing apparatus that can shoot still images and moving images (hereinafter, "digital camera").

<Configuration of Digital Camera>

Figure 1:
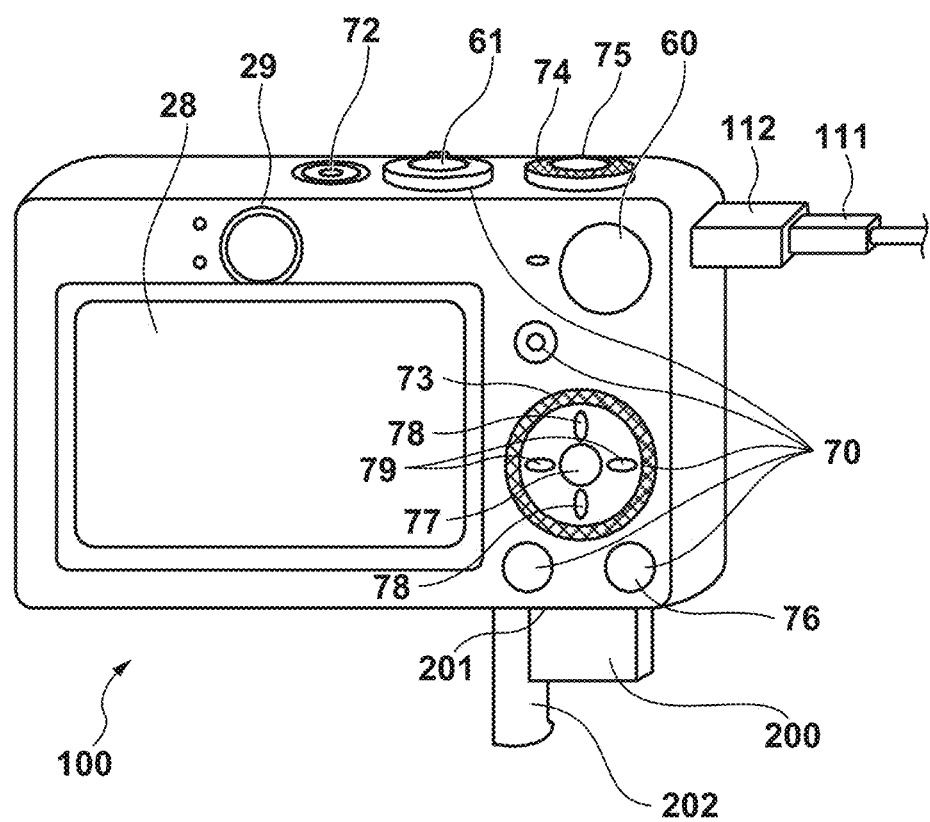
FIG. 1 shows an external appearance of a digital camera serving as an example of an electronic device.

FIG. 1 shows an external appearance of a digital camera 100 according to the present embodiment. A display unit 28 is constituted by, for example, a liquid crystal display, and displays images and various types of information. A shutter button 61 is an operation unit for issuing a shooting instruction. A mode switching dial 60 is an operation unit for switching among various modes. A connector 112 allows a connection cable 111 to be connected to the digital camera 100. A viewfinder 29 is an eyepiece viewfinder that is used by a user to check the composition when shooting. Although the viewfinder 29 is an electronic viewfinder in the present embodiment, it may be an optical viewfinder. In the case of the optical viewfinder also, a later-described DialFunc gauge, allocation function gauge, and the like are displayed inside the viewfinder in such a manner that they can be observed by the user.

An operation unit 70 includes operation members that accept various user operations, for example, various switches, buttons, and a touchscreen. A controller wheel 73 (hereinafter, "wheel 73") is an operation member that is included in the operation unit 70 and can be operated by being rotated. A power switch 72 is a push button for switching between power ON and power OFF. The operation unit 70 also includes a MENU button 76, a SET button 77, up and down buttons 78, and left and right buttons 79. These operation members are used in later-described MENU setting changing processing (step S429 of FIG. 4A-1).

Figure 3B:
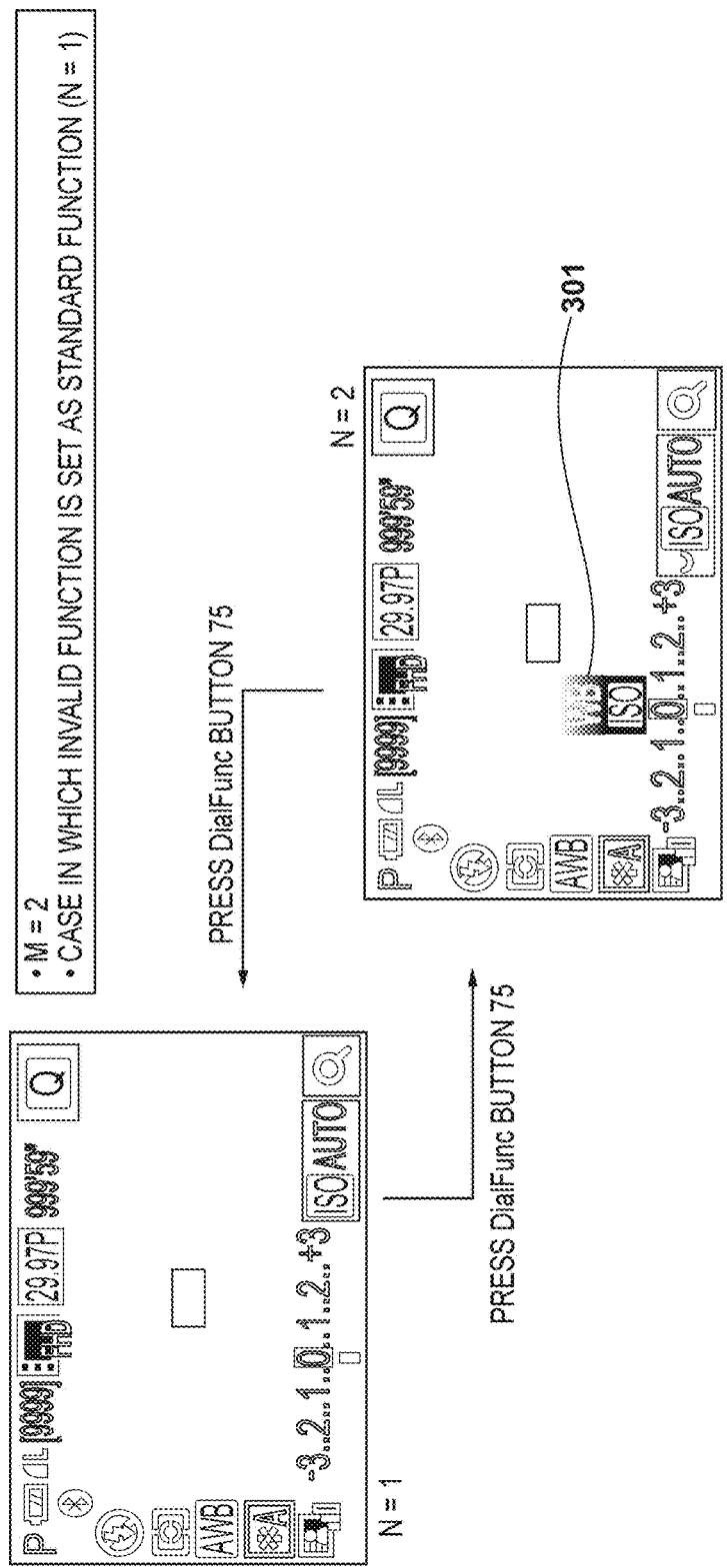

A sub electronic dial 74 (first operation member) is a rotatable operation member that is arranged around a DialFunc button 75. In the present embodiment, the user presses the DialFunc button 75 (second operation member) to switch an item in a selected state among items to be set, and uses the sub electronic dial 74 to change a set value related to the item in the selected state. In changing the set value, the later-described DialFunc gauge and allocation function gauge shown in FIGS. 3A to 3C are displayed. In order to allow the user to easily change the set value while looking through the viewfinder 29, it is desirable that the DialFunc button 75 and the sub electronic dial 74 be arranged in the vicinity of the shutter button 61. In order to achieve more favorable usability, it is desirable that the DialFunc button 75 and the sub electronic dial 74 be arranged on the same surface as the shutter button 61 (on a top surface of the digital camera, rather than a back surface). The DialFunc button 75 and the sub electronic dial 74 are positioned so as to be operable using fingers that belong to the same right hand as the right index finger that operates the shutter button 61. That is, the DialFunc button 75 is arranged based on the assumption that it is pressed by the right index or middle finger. The sub electronic dial 74 is arranged based on the assumption that it is operated by being rotated by the right thumb. The DialFunc button 75 and the sub electronic dial 74 are arranged so as to be closer to the shutter button than to the viewfinder 29.

A recording medium 200 is, for example, a memory card or a hard disk. The recording medium 200 can be housed in a recording medium slot 201. When housed in the recording medium slot 201, the recording medium 200 can communicate with the digital camera 100. A cover 203 is provided as a cover for the recording medium slot 201.

Figure 2:
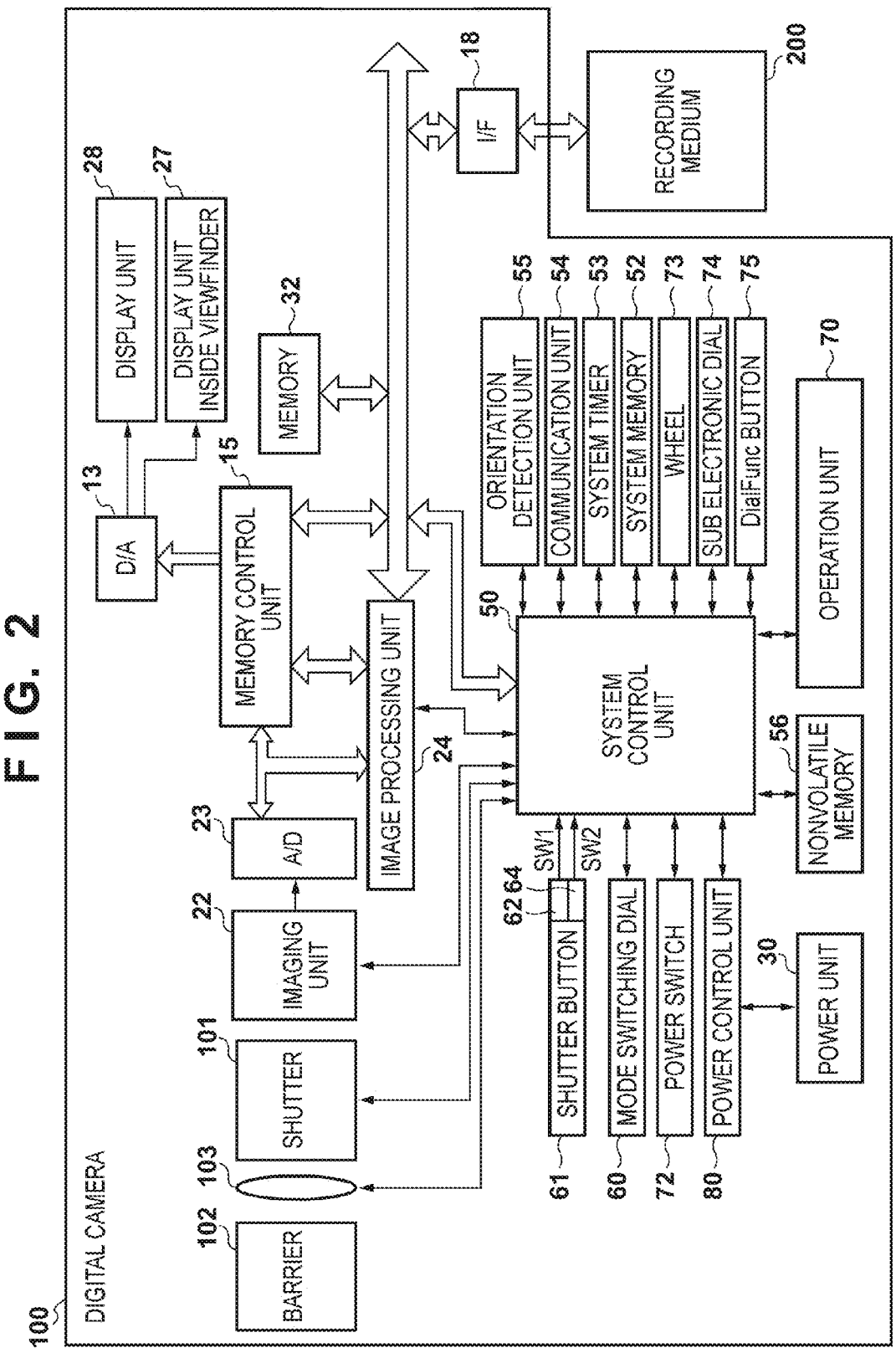
FIG. 2 is a block diagram showing an exemplary configuration of the digital camera.

FIG. 2 is a block diagram showing an exemplary configuration of the digital camera 100 according to the present embodiment. In FIG. 2, a photographing lens 103 is a lens assembly including a zooming lens and a focusing lens. A shutter 101 has a diaphragm function. An imaging unit 22 is an image sensor composed of, for example, a CCD or CMOS element that converts optical images into electrical signals. An A/D converter 23 converts analog signals into digital signals. The A/D converter 23 is used to convert analog signals output from the imaging unit 22 into digital signals. A barrier 102 covers an image capturing system of the digital camera 100, including the photographing lens 103, so as to prevent a stain and damage on the image capturing system, including the photographing lens 103, the shutter 101, and the imaging unit 22.

An image processing unit 24 applies predetermined pixel interpolation, resizing processing (e.g., size reduction), and color conversion processing to data from the A/D converter 23 or data from a memory control unit 15. The image processing unit 24 also executes predetermined computation processing using image data obtained by image capture. A system control unit 50 performs exposure control and ranging control based on the computation result obtained by the image processing unit 24. Consequently, autofocus (AF) processing, auto exposure (AE) processing, and preliminary flash emission (EF) processing according to a through-the-lens (TTL) method are executed. The image processing unit 24 further executes auto white balance (AWB) processing according to the TTL method based on the computation result obtained by executing the predetermined computation processing using image data obtained by image capture.

Data output from the A/D converter 23 is written directly to a memory 32 via the image processing unit 24 and the memory control unit 15, or via the memory control unit 15. The memory 32 stores image data that has been obtained by the imaging unit 22 and converted into digital data by the A/D converter 23, and image data to be displayed by the display unit 28. The memory 32 has a sufficient storage capacity to store a predetermined number of still images, as well as moving images and audio of a predetermined period.

The memory 32 also serves as a memory for image display (video memory). A D/A converter 13 converts data for image display stored in the memory 32 into analog signals, and supplies the analog signals to the display unit 28. In this way, image data for display that has been written to the memory 32 is displayed by the display unit 28 via the D/A converter 13. The display unit 28 displays contents corresponding to analog signals from the D/A converter 13 on the display, such as the LCD. The D/A converter 13 applies digital-to-analog conversion to digital signals that have undergone A/D conversion by the A/D converter 23 and been accumulated in the memory 32, and the resultant analog signals are successively transferred to and displayed by the display unit 28; this enables the display unit 28 to display through-the-lens images (live-view display). Furthermore, the D/A converter 13 applies digital-to-analog conversion to digital signals accumulated in the memory 32, and the resultant analog signals are successively transferred to and displayed by a display unit 27 inside the viewfinder; this enables the viewfinder 29 to function as the electronic viewfinder.

A nonvolatile memory 56 is an electrically erasable and recordable memory, and an EEPROM and the like are used thereas. The nonvolatile memory 56 stores constants, programs, and the like for the operations of the system control unit 50. The programs mentioned here denote programs for executing various flowcharts according to the present embodiment, which will be described later.

The system control unit 50 controls an entirety of the digital camera 100. Various types of processing according to the present embodiment, which will be described later, are realized by executing programs recorded in the aforementioned nonvolatile memory 56. A RAM is used as a system memory 52. The system memory 52 stores constants and variables for the operations of the system control unit 50, and programs that have been read out from the nonvolatile memory 56 and the like are deployed thereto. The system control unit also performs display control by controlling the memory 32, the D/A converter 13, the display unit 28, and the like.

The mode switching dial 60, the shutter button 61, and the operation unit 70 are operation means for inputting various operational instructions to the system control unit 50. The mode switching dial 60 switches to one of the following operation modes of the system control unit 50: a still image recording mode, a moving image shooting mode, a reproduction mode, etc. The still image recording mode includes an auto shooting mode, an auto scene discrimination mode, a manual mode, various scene modes that each have shooting settings designed for a corresponding shooting scene, a program AE mode, a custom mode, and so forth. Switching among these modes may be performed by operating a menu, or may be performed directly using the mode switching dial 60. Alternatively, a menu screen may contain these modes, and switching to one of these modes may be performed by operating a menu after switching to the menu screen using the mode switching dial 60. The moving image shooting mode may similarly include a plurality of modes.

A first shutter switch 62 is turned ON and generates a first shutter switch signal SW1 when the shutter button 61 provided on the digital camera 100 is operated, or pressed, halfway (issues a shooting preparation instruction). The first shutter switch signal SW1 initiates the operations of the autofocus (AF) processing, the auto exposure (AE) processing, the auto white balance (AWB) processing, the preliminary flash emission (EF) processing, and the like.

A second shutter switch 64 is turned ON and generates a second shutter switch signal SW2 when an operation performed on the shutter button 61 is complete, that is, when the shutter button 61 is fully pressed (issues a shooting instruction). The second shutter switch signal SW2 causes the system control unit 50 to start a series of operations of shooting processing, from readout of signals from the imaging unit 22 to writing of image data to the recording medium 200.

The operation members of the operation unit 70 can, for example, select and operate a variety of function icons displayed on the display unit 28; consequently, appropriate functions are allocated to the operation members on a scene-by-scene basis, and the operation members act as various function buttons. Examples of the function buttons include a stop button, a return button, an image switch button, a jump button, a narrow-down button, and an attribute changing button. For example, when the MENU button 76 is pressed, the display unit 28 displays a menu screen on which various settings can be configured. The user can configure various settings intuitively using the menu screen displayed by the display unit 28, the four directional (up, down, left and right) buttons, and the SET button.

The wheel 73 is an operation member that is included in the operation unit 70, can be operated by being rotated, and is used together with the directional buttons to, for example, designate an item to be selected. The sub electronic dial 74 is a rotatable operation member that is included in the operation unit 70 and used to, for example, designate an item to be selected, similarly to the controller wheel 73. When the sub electronic dial 74 is operated by being rotated, an electrical pulse signal is generated in accordance with an amount of rotation (an amount of operation). The system control unit 50 controls various components of the digital camera 100 based on this pulse signal. The DialFunc button 75 is a member for changing a function allocated to the sub electronic dial 74.

Pressing the DialFunc button 75 sequentially allocates a plurality of registered function items to the sub electronic dial 74 as temporary functions. The user can change a set value of an allocated function item by operating the sub electronic dial 74. With the use of a MENU screen, the user can also change the state of registration of the plurality of function items that are switchable using the DialFunc button 75. That is, on the MENU screen, the user can select functions to be allocated to the sub electronic dial 74, and set the order of switching among these functions. The system control unit 50 performs control to switch among the selected functions in response to pressing of the DialFunc button 75. In this way, setting functions provided by the DialFunc button 75 and the sub electronic dial 74 can be customized.

A power control unit 80 is composed of, for example, a battery detection circuit, a DC-DC converter, and a switch circuit for switching among blocks to which current is applied, and detects whether the battery has been loaded, a type of the battery, and a remaining battery level. The power control unit 80 also supplies necessary voltage for a necessary period to various components, including the recording medium 200, by controlling the DC-DC converter based on the detection results and an instruction from the system control unit 50. Examples of a power unit 30 include: a primary battery, such as an alkaline battery and a lithium battery; a secondary battery, such as a NiCd battery, a NiMH battery, and a Li-ion battery; and an AC adaptor. A recording medium I/F 18 is an interface for the recording medium 200 which is, for example, a memory card or a hard disk. The recording medium 200 is a memory card or a similar recording medium for recording shot images, and is composed of, for example, a semiconductor memory or a magnetic disk.

A system timer 53 is a time measurement unit that measures periods used in various types of control, and time indicated by an internal clock. A communication unit 54 exchanges image signals and audio signals with an external apparatus when connected to the external apparatus via a wireless or wired cable. The communication unit 54 can also be connected to a wireless local area network (LAN) and the Internet. The communication unit 54 can transmit images captured by the imaging unit 22 (including through-the-lens images) and images recorded in the recording medium 200, and receive image data and various types of other information from the external apparatus.

<Settings by DialFunc Button 75 and Sub Electronic Dial 74>

During the execution of a shooting mode, the digital camera 100 can change and set white balance, ISO, exposure, and the like based on operations performed on the DialFunc button 75 and the sub electronic dial 74. As will be described later, the user can customize the types, the number, and the order of function items registered with the DialFunc button 75. Herein, N denotes a function number indicating the order of function items registered with the DialFunc button 75, and M denotes the total number of function items registered with the DialFunc button 75 (the number of items). For example, when the number of items M is three, pressing the DialFunc button 75 switches among function items allocated to the sub electronic dial 74 in the following order: N=1→2→3→1→2→3→1 and so on.

In the present embodiment, a function item that is set (registered) in correspondence with the function number N=1 is referred to as a standard function. A standard function is a default function that is allocated to the sub electronic dial 74 at the start of a shooting mode before the DialFunc button 75 is operated. If the sub electronic dial 74 is operated without pressing the DialFunc button 75 at all, a set value related to this standard function is changed. However, in this case, if the sub electronic dial 74 is accidentally operated, the setting of the standard function will be changed. In view of this, in the present embodiment, functions that can be set to the DialFunc button 75 include an invalid function that does not make any change to a set value in response to an operation performed on the sub electronic dial 74. Using such an invalid function as the standard function can prevent accidental operations of the sub electronic dial 74. When the invalid function is set as the standard function, no function is activated in response to an operation performed on the sub electronic dial 74 before the DialFunc button 75 is operated, and the sub electronic dial 74 starts functioning at or after the time of pressing of the DialFunc button 75. In the present embodiment, function items that are set (registered) in correspondence with the function numbers N=2 and up are referred to as temporary functions. A temporary function is executed when the sub electronic dial 74 is operated until the elapse of a certain period, or until another operation member is operated, after the DialFunc button 75 is operated. One or more function items may be registered as temporary functions, and no function item may be registered as temporary functions.

FIGS. 3A to 3C show examples of a display state of the display unit 28 or the viewfinder 29 when a function allocated to the sub electronic dial 74 is switched sequentially among a plurality of function items registered as a set in response to pressing of the DialFunc button 75. Although the display examples of FIGS. 3A to 3C show a blank background, it will be assumed that, in reality, live-view (LV) images are displayed with each display item superimposed thereon. FIG. 3A shows an operation/display example for a case in which a plurality of function items are registered with the DialFunc button 75 in addition to the standard function, and the invalid function is set as the standard function. In this case, the function number N=1 is given to the invalid function, the function number N=2 is given to ISO, the function number N=3 is given to white balance (hereinafter "WB"), and the function number N=4 is given to a photometric mode; thus, the number of items M is four, that is, a set of four items is registered.

In FIG. 3A, in the state of N=1 (before the DialFunc button 75 is operated), no change occurs even if the sub electronic dial 74 is operated. When N is incremented to two (N=2) by pressing the DialFunc button 75, a DialFunc gauge 301 indicating that ISO is currently set is displayed. If the sub electronic dial 74 is operated in this state, an allocation function gauge 302 indicating the state of setting by the sub electronic dial 74 is displayed, a set value of ISO is changed, and the allocation function gauge 302 shows the state of the change. Subsequently, when N is incremented to three (N=3) by pressing the DialFunc button 75, a WB setting function is allocated to the sub electronic dial 74, and the DialFunc gauge 301 shows WB. If the sub electronic dial 74 is operated in this state, the allocation function gauge 302 indicating the state of setting by the sub electronic dial 74 is displayed, a set value of white balance is changed, and the allocation function gauge 302 shows the state of the change. Thereafter, when N is incremented to a value larger than M (N>M, specifically N=5 in FIG. 3A) by pressing the DialFunc button 75, the function corresponding to N=2 is allocated to the sub electronic dial 74 again, and the foregoing operations are repeated. In the case of FIG. 3A, as the function number N=1 is given to the invalid function, the state of N=1 is not resumed during selection of a function using the DialFunc button 75.

FIG. 3B shows an operation/display example for a case in which one function item is registered with the DialFunc button 75 in addition to the standard function (the number of items M=2), and the invalid function is set as the standard function. In this case, the function number N=1 is given to the invalid function, and the function number N=2 is given to ISO; thus, the number of items M is two, that is, a set of two items is registered. In FIG. 3B, when N>M (N=3 in FIG. 3B), the function corresponding to the function number N=1, that is, the invalid function is allocated to the sub electronic dial 74 again. When the number of items M is two, if control is performed to return to the state of the function number N=2 as in FIG. 3A, no change (no response) occurs even if the DialFunc button 75 is operated; this gives a sense of discomfort to the user. By returning to the state of the function number N=1 as shown in FIG. 3B, the user can feel that he/she has switched between ON and OFF of a setting function provided by the sub electronic dial 74 by pressing the DialFunc button 75, that is, the sense of discomfort is eliminated.

FIG. 3C shows an operation/display example for a case in which a plurality of function items are registered with the DialFunc button 75 in addition to the standard function, and a function (WB in FIG. 3C) other than the invalid function is set as the standard function. In the case of FIG. 3C, the function number N=1 is given to WB (not the invalid function), the function number N=2 is given to ISO, and the function number N=3 is given to the photometric mode; thus, the number of items M is three, that is, a set of three items is registered. As a function other than the invalid function is set as the standard function, the allocation function gauge 302 is displayed and setting of the function item that is registered in correspondence with the function number N=1 (WB in the present example) is enabled in response to an operation performed on the sub electronic dial 74, even before the DialFunc button 75 is pressed. Furthermore, when the function number N=2 is set in response to an operation performed on the DialFunc button 75, the DialFunc gauge 301 corresponds to ISO, and a set value related to ISO can be changed and set using the sub electronic dial 74. Furthermore, as the invalid function is not set as the standard function, when N is incremented to a value larger than M (N>M) in response to an operation performed on the DialFunc button 75, the function corresponding to N=1 is allocated to the sub electronic dial 74 again.

Note that the DialFunc gauge 301 displays the function item that is currently set (the function item corresponding to N) in a dark color, and also displays, thereabove, the function item that was set before pressing the DialFunc button 75 (the function item corresponding to N−1) with a gradation that becomes lighter in the upward direction. This indicates a relationship between the function items before and after the switching performed by pressing the DialFunc button 75. As the DialFunc button 75 is a push button provided on the top surface of the digital camera 100 as shown in FIG. 1, it is operated, or pressed, from up to down. This operation direction (from up to down) corresponds to the display positions of the function items before and after the switching in the DialFunc gauge 301 (the function item before the switching is displayed at the top, and the function item after the switching is displayed at the bottom). Therefore, the user can easily understand that the DialFunc gauge 301 is displayed as a guide related to pressing of the DialFunc button 75.

On the other hand, the allocation function gauge 302 displays a current set value in the middle in a dark shade, and displays set value candidates, which precede and succeed the current set value, immediately to the right and left of the current set value. The set value candidates are displayed with a gradation that becomes lighter in the leftward and rightward directions. Therefore, the user can easily understand that the allocation function gauge 302 is a guide related to an operation performed on the sub electronic dial 74 that rotates leftward and rightward as shown in FIG. 1 (that has a rotation axis extending in the up-down direction). Furthermore, in contrast to the DialFunc gauge 301 that displays items lined up in the up-down direction, the allocation function gauge 302 displays set value candidates lined up in the left-right direction. That is, the direction in which the items are lined up in one gauge is perpendicular to the direction in which the items are lined up in the other gauge. Therefore, the user can easily understand that the function items displayed by the DialFunc gauge 301, which are switchable by the DialFunc button 75, are orthogonal to the set values displayed by the allocation function gauge 302.

<Processing of Shooting Mode>

Using the flowcharts of FIGS. 4A-1, 4A-2, 4B and 4C, the following describes processing of a shooting mode including the foregoing screen transitions. FIGS. 4A-1, 4A-2, 4B and 4C are the flowcharts of shooting control performed in a still image shooting mode, and these flowcharts realize the foregoing screen transitions shown in FIGS. 3A to 3C. The steps of the flowcharts of FIGS. 4A-1, 4A-2, 4B and 4C are realized by the system control unit 50 deploying programs stored in the nonvolatile memory 56 and the like to the system memory 52 and executing the deployed programs. Note that the screen transitions shown in FIGS. 3A to 3C may be made also in a moving image shooting mode.

When the still image shooting mode has been started, the system control unit 50 first executes initial display processing in step S400. In the initialization processing, set values of still images are obtained from the nonvolatile memory 56 and stored to the system memory 52, and live-view (LV) display is performed by displaying image data from the imaging unit 22. The LV display denotes display of substantially real-time still images captured by the imaging unit 22 on the display unit 28 or the viewfinder 29 without recording them to the recording medium 200, and a photographer can check the angle of view and determine the timing of shooting by viewing the displayed images.

In step S401, the system control unit 50 obtains the number of function items registered with the DialFunc button 75 (the number of items M), which is stored in the nonvolatile memory 56 and the like. Next, in step S402, the system control unit 50 initializes the current function number N of the DialFunc button 75, which is stored in the nonvolatile memory 56 and the like, to one. The function number N is used to manage the order of function items so as to switch sequentially among function items to be allocated to the sub electronic dial 74 in response to pressing of the DialFunc button 75.

Next, in step S403, the system control unit 50 determines whether the sub electronic dial 74 has been operated. If the system control unit 50 determines that the sub electronic dial 74 has been operated (YES of step S403), it determines whether the current function number N of the DialFunc button 75 is one in step S404 of FIG. 4C. If N is one (YES in step S404), the system control unit 50 reads out a function (standard function) corresponding to the function number 1 of the DialFunc button 75, which is stored in the nonvolatile memory 56 and the like, and determines whether the standard function is the invalid function in step S405. If it is determined that the standard function is the invalid function in step S405, it means that the current function number N of the DialFunc button 75 is one, and the function item corresponding to the function number 1 is the invalid function. Thus, the system control unit 50 ignores the operation performed on the sub electronic dial 74, and returns to the process of step S403 of FIG. 4A-1. This corresponds to a case in which the sub electronic dial 74 is operated in the state of N=1 shown in FIGS. 3A and 3B.

Figures 1, 4A:
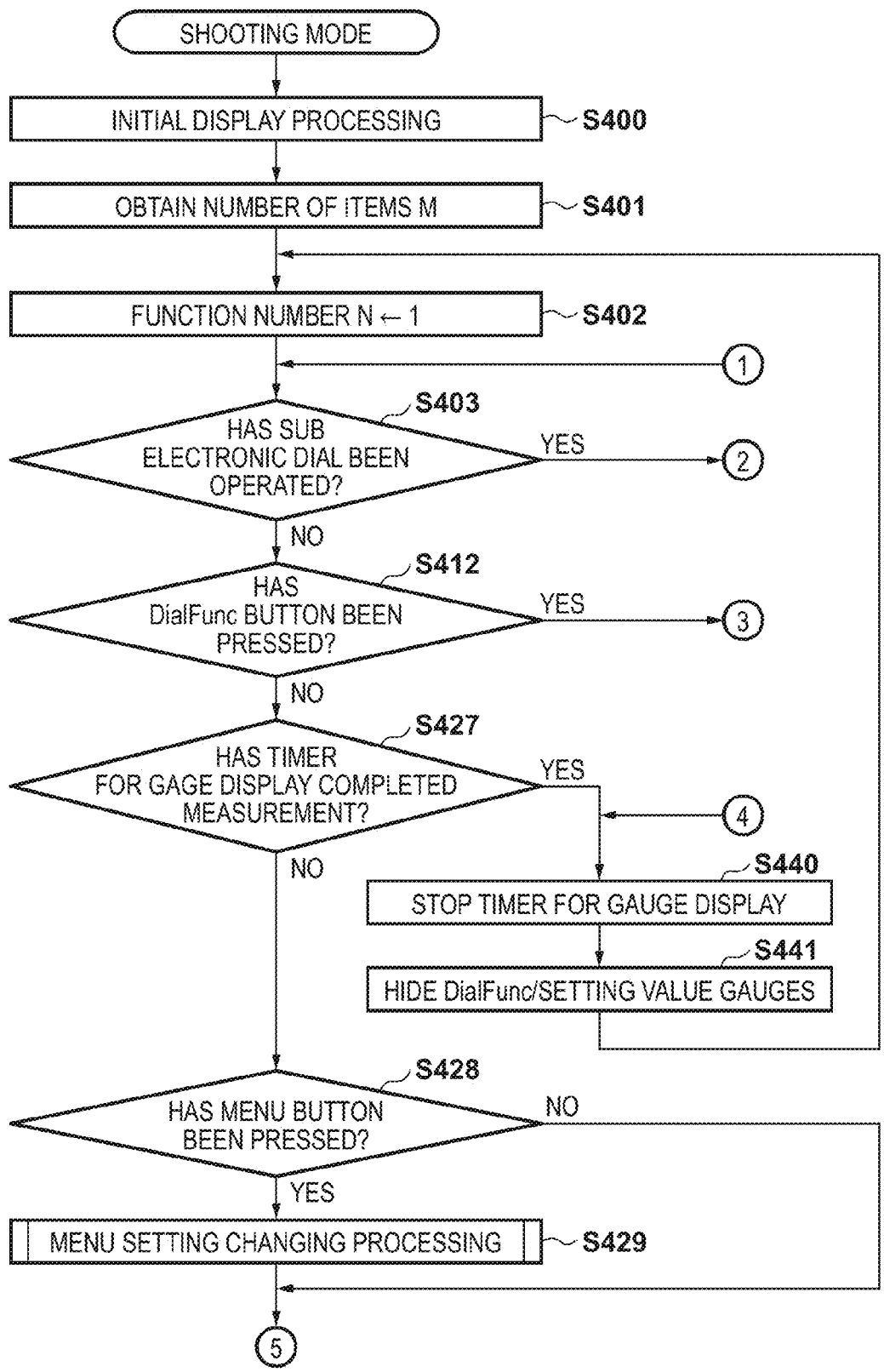
Figures 2, 4A:
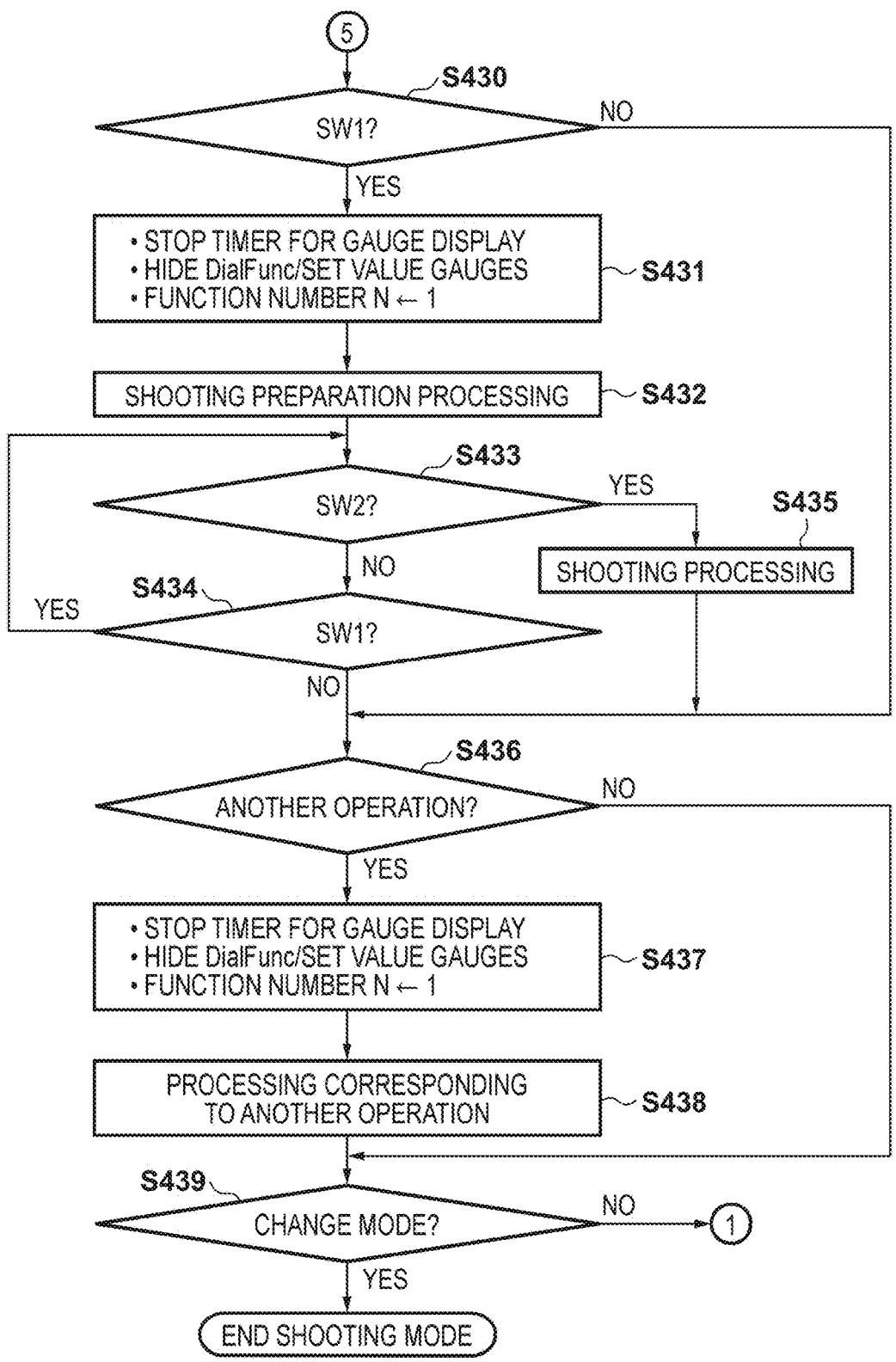
Figure 4B:
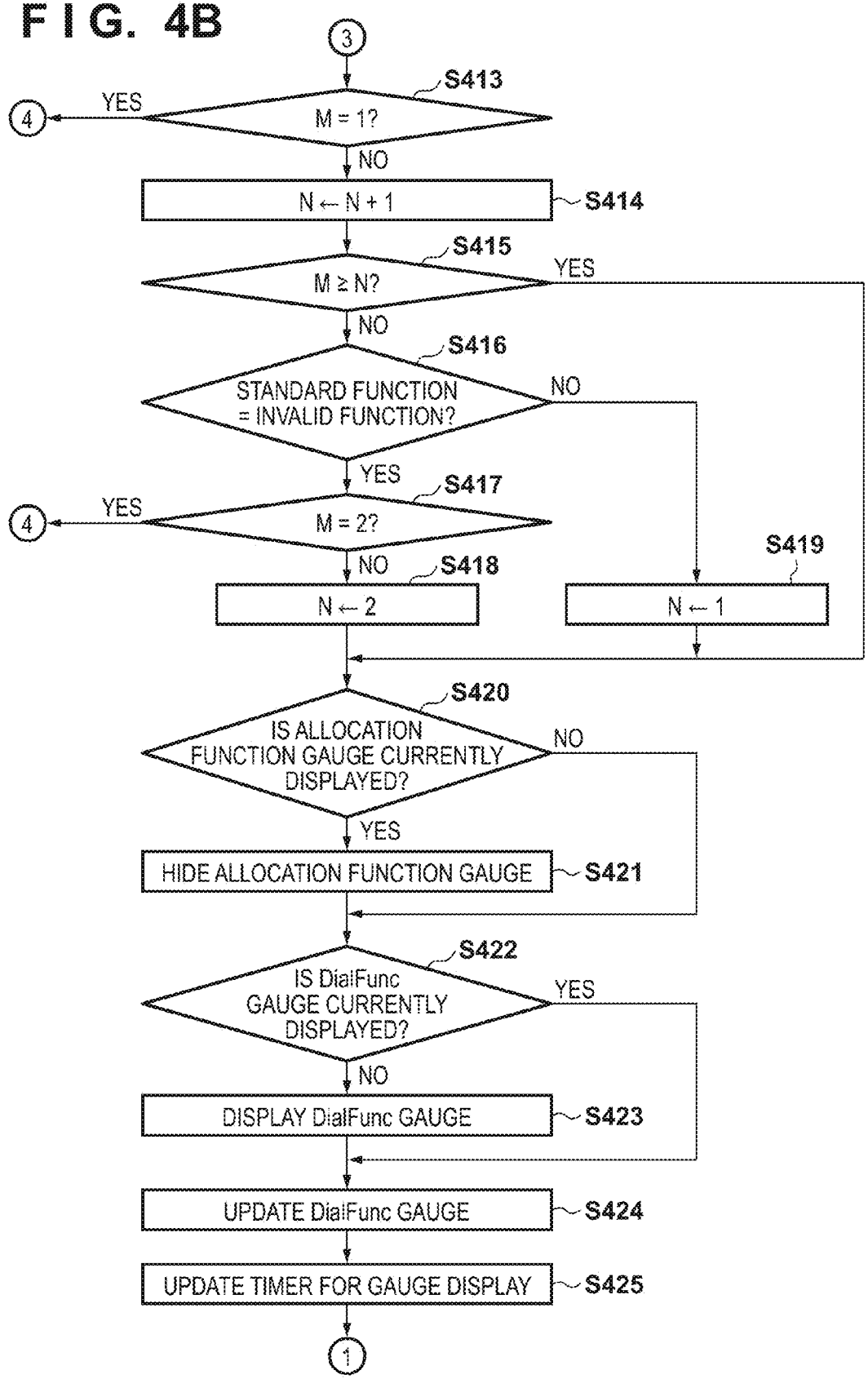
Figure 4C:
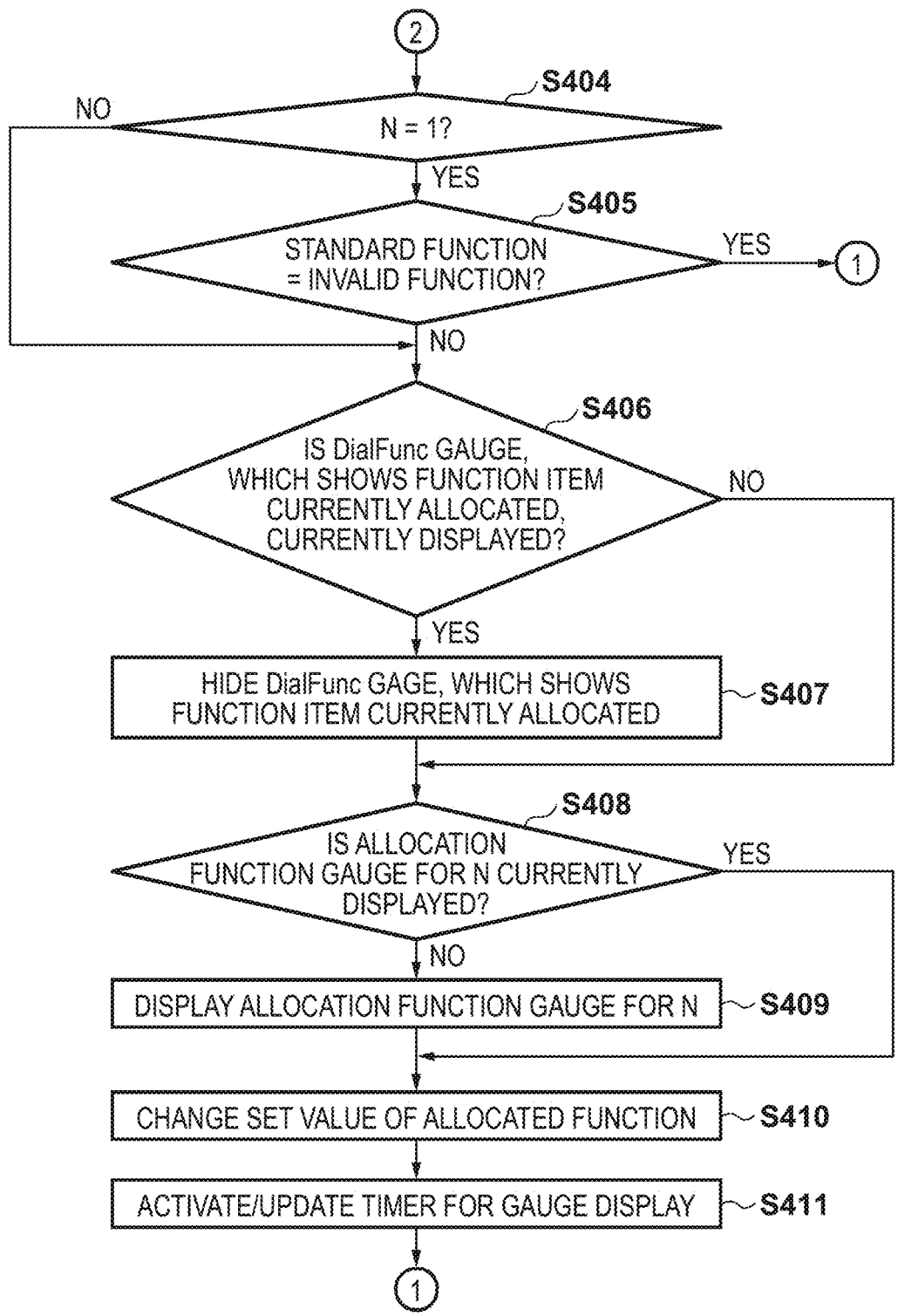

In FIG. 4C, if it is determined that N is not one in step S404, or if it is determined that the standard function is not the invalid function in step S405, the processes of step S406 and subsequent steps are executed. In step S406, the system control unit 50 determines whether the DialFunc gauge 301, which shows a function item that has been selected by pressing the DialFunc button 75 (that is currently allocated), is currently displayed. If it is determined that the DialFunc gauge 301 showing the selected function item is currently displayed in step S406, step S407 follows. In step S407, the system control unit 50 first hides the DialFunc gauge 301 so as to display the allocation function gauge 302 in place of the DialFunc gauge 301. On the other hand, if it is determined that the DialFunc gauge showing the selected function item is not displayed (NO of step S406), step S407 is skipped.

In step S408, the system control unit 50 determines whether the allocation function gauge that is displayed when the sub electronic dial 74 is operated for the function item registered in correspondence with the function number N (the allocation function gauge for N) is currently displayed. If the allocation function gauge for the function item registered in correspondence with the function number N is hidden (NO of step S408), the system control unit 50 generates and displays the allocation function gauge corresponding to the function number N in step S409. For example, when the function number N corresponds to WB, the allocation function gauge 302 for WB shown in FIG. 3A is displayed. Thereafter, in step S410, the system control unit 50 obtains an operation amount by which the sub electronic dial 74 has been operated, and updates display of the allocation function gauge by changing a set value of the function item that is currently allocated in accordance with the operation amount. After the set value is updated, the system control unit 50 activates/updates a timer for gauge display in step S411, and then repeats the processes of step S403 and subsequent steps.

If the system control unit 50 determines that the sub electronic dial 74 has not been operated in step S403 of FIG. 4A-1, it determines whether the DialFunc button 75 has been pressed in step S412. If it is determined that the DialFunc button 75 has been pressed, the processes of step S413 shown in FIG. 4B and subsequent steps are executed. The processes of steps S413 to S425 control switching among function items to be allocated to the sub electronic dial 74 in response to the operation performed on the DialFunc button 75 based on whether the standard function is the invalid function and on the number of registered function item in the set. In step S413, the system control unit 50 determines whether the number of items M registered with the DialFunc button 75 is one. If the number of items M is one, the system control unit 50 hides the DialFunc gauge 301 and the allocation function gauge 302 in steps S440 and S441 of FIG. 4A-1. If the number of items M is one and a function item other than the invalid function is registered in correspondence with the function number N=1, the gauges are hidden in response to the operation performed on the Dial-Func button 75; in this way, the user can perceive a response to the operation performed on the DialFunc button 75, and the feeling of performing the operation is improved. If the number of items M is not one, the system control unit 50 increments the value of the function number N by one in step S414. Then, in step S415, the system control unit 50 compares the function number N with the number of items M registered with the DialFunc button 75.

If the result of comparison in step S415 indicates M<N, the system control unit 50 reads out the standard function stored in the nonvolatile memory 56 and the like, and determines whether the standard function (the function item corresponding to N=1) is the invalid function in step S416. If the system control unit 50 determines that the standard function is the invalid function, it determines whether the number of items M registered with the DialFunc button 75 is two in step S417. If M is two, it means that the number of items registered as switchable items is only two, the two functions include the invalid function as the standard function, and the function number N is larger than M. Therefore, in order to execute processing for allocating the invalid function to the sub electronic dial 74 again, step S440 of FIG. 4A-1 follows. In the process of step S402 that follows the processes of steps S440 and S441, one is set as the function number N, and the invalid function set as the standard function is allocated to the sub electronic dial 74. This process corresponds to the switching operation shown in FIG. 3B. When the number of items M is two and the standard function is the invalid function, this process switches a function allocated to the sub electronic dial 74 alternately between the standard function and another function item in response to the operation performed on the DialFunc button 75. Therefore, the user can feel that he/she has switched between ON and OFF of a set state of a function item by pressing the DialFunc button 75.

On the other hand, if M is not two in step S417 of FIG. 4B (M≥3 in the present case), it means that the standard function is the invalid function and a plurality of function items are registered in addition to the invalid function. Therefore, in step S418, the system control unit 50 sets the function number N to two, which corresponds to a function item next to the standard function, so as to switch among the function items excluding the standard function. This process realizes the switching operation shown in FIG. 3A (the operation of switching to N=2 after N=4). That is, a function item allocated to the sub electronic dial 74 is switched among a plurality of function items excluding the invalid function in response to pressing of the DialFunc button 75.

If it is determined that the standard function is not the invalid function in step S416, a function item other than the invalid function is allocated to the standard function (a set value of this function item is changed by operating the sub electronic dial 74). Therefore, in step S419, the system control unit 50 sets the function number N to one so as to enable switching among the function items including the standard function. This process corresponds to the switching operation shown in FIG. 3C (the operation of switching to N=1 after N=3).

Once the function number N has been updated in any of steps S414, S418, and S419, the system control unit 50 allocates the function item set in correspondence with the updated function number N to the sub electronic dial 74, thereby enabling the user to change a set value of this function item. First, in step S420, the system control unit 50 determines whether the allocation function gauge, which is displayed when the sub electronic dial 74 is operated, is currently displayed. If the allocation function gauge 302 is currently displayed, the system control unit 50 hides the allocation function gauge in step S421 so as to display the DialFunc gauge 301 in place of the allocation function gauge 302. On the other hand, if it is determined that the allocation function gauge is not currently displayed in step S420, step S421 is skipped. In this case, the allocation function gauge corresponding to the updated function number N is displayed when steps S408 and S409 are executed in response to an operation performed on the sub electronic dial 74. Note that the DialFunc gauge 301 and the allocation function gauge 302 may be displayed simultaneously. In this case, processing for displaying the allocation function gauge corresponding to the updated function number N is executed in place of the processes of steps S420 and S421. In this case, the allocation function gauge corresponding to the updated function number N is displayed, together with the DialFunc gauge 301, immediately after the DialFunc button 75 is pressed.

In step S422, the system control unit 50 determines whether the DialFunc gauge 301, which is displayed when the DialFunc button 75 has been pressed, is currently displayed. If the DialFunc gauge is hidden, the system control unit 50 generates and displays the DialFunc gauge focusing on the function number 1 (the standard function) in step S423. If it is determined that the DialFunc gauge is currently displayed in step S422, step S423 is skipped. In step S424, the system control unit 50 displays the updated DialFunc gauge focusing on the function number N.

When the DialFunc gauge is hidden, steps S422 to S424 display the DialFunc gauge focusing on the function number 1, and then update it to the DialFunc gauge focusing on the current function number. When the DialFunc gauge is already displayed, the DialFunc gauge focusing on the function number N before the update is updated to the DialFunc gauge focusing on the current function number. In step S423, the DialFunc gauge focusing on the function item corresponding to the function number N=1 is displayed; alternatively, in step S423, the DialFunc gauge focusing on the updated function number N may be immediately displayed. Once the foregoing update of display of the DialFunc gauge has finished, the system control unit 50 updates the timer for gauge display in step S425 (activates the timer if the timer is in a stopped state, and reactivates and initializes the timer if the timer is in an activated state). Thereafter, the system control unit 50 repeats the processes of step S403 and subsequent steps.

In FIG. 4A-1, if the system control unit 50 determines that the sub electronic dial 74 has not been operated in step S403 and that the DialFunc button 75 has not been pressed in step S412, it checks whether the timer for gauge display has completed the measurement in step S427. If the system control unit 50 determines that the timer for gauge display has completed the measurement, it stops the timer for gauge display in step S440. Then, in step S441, the system control unit 50 hides all gauges (the allocation function gauge and the DialFunc gauge). Thereafter, the system control unit 50 repeats the processes of step S402 and subsequent steps. In the above-described manner, if a state in which an operation performed on the sub electronic dial 74 or the DialFunc button 75 is not detected continues for a certain period after a function has been set, the gauges are hidden and the standard function is allocated to the sub electronic dial 74 again (the function number N is set to one again). Note that the timer for gauge display measures a period in a range of two seconds to ten seconds inclusive, more preferably, approximately four seconds (this period is equivalent to the aforementioned certain period).

If the system control unit 50 determines that the timer for gauge display has not completed the measurement in step S427, it determines whether the MENU button 76 has been pressed in step S428. If the system control unit 50 determines that the MENU button 76 has been pressed, it accepts operations performed on the MENU screen and changes various set values in step S429. The various set values include items of "register sub electronic dial functions" intended to change the types of function items registered with the DialFunc button 75 and the number of these function items M, and items of "set rearrangement of sub electronic dial functions" intended to change and register a correspondence between the function numbers N and the function items (the order of the function items). They will be described later with reference to FIGS. 5A to 8.

In step S430, the system control unit 50 determines whether the first shutter switch signal SW1 has been generated by pressing the shutter button 61 (third operation member) halfway. Step S431 follows if the SW1 has been generated, and step S436 follows otherwise. In step S431, the system control unit 50 stops the timer for gauge display, and hides all gauges (the allocation function gauge and the DialFunc gauge). It also initializes the current function number N of the DialFunc button 75, which is stored in the nonvolatile memory 56 and the like, to one. That is, even if the timer for gauge display has not completed the measurement yet, the standard function is allocated to the sub electronic dial 74 again when the shutter button 61 is pressed halfway. In step S432, the system control unit 50 starts shooting preparation processing, including the autofocus (AF) processing, the auto exposure (AE) processing, the auto white balance (AWB) processing, the preliminary flash emission (EF) processing, and the like. In step S433, the system control unit 50 determines whether the second shutter switch signal SW2 has been generated by fully pressing the shutter button 61. Step S435 follows if the SW2 has been generated, and step S434 follows otherwise. In step S434, the system control unit 50 determines whether the first shutter switch signal SW1 has been continuously generated by pressing the shutter button 61 halfway. Step S433 follows if the signal has been continuously generated, and Step S436 follows if the signal has not been continuously generated, that is, if the half-pressed state of the shutter button 61 has been cancelled. In step S435, the system control unit 50 executes the aforementioned shooting processing.

In step S436, the system control unit 50 determines whether any other valid operation has been performed on the operation unit 70. Step S437 follows if any valid operation has been performed, and step S439 follows otherwise. It is determined that no valid operation has been performed in step S436 if the operation performed on the operation unit 70 is an operation with respect to an operation member to which no function is allocated at that point, or an operation with respect to an operation member to which an invalid function is allocated and which is ignored when operated. The process of step S437 is similar to that of step S431. In step S438, the system control unit 50 executes processing corresponding to the operation that was determined to have been performed in step S436. In this way, even if the timer for gauge display has not completed the measurement yet, when any valid operation is performed, the standard function is allocated to the sub electronic dial 74 again, and processing corresponding to the operation is executed. For example, when an INFO button (a button for switching among display modes) included in the operation unit 70 is pressed, the standard function is allocated to the sub electronic dial 74 again, and a current display mode is switched. The number of items that display information, such as the statuses of shooting settings being configured, and the level of detail of the displayed information vary among different display modes, and pressing the INF button switches among the display modes sequentially.

In step S439, the system control unit 50 determines whether a mode changing operation has been performed. The mode changing operation denotes an operation for issuing an instruction to make a transition to other operations, for example, a reproduction mode. If the system control unit 50 determines that the mode changing operation has not been performed, it repeats the processes of step S402 and subsequent steps. If the system control unit 50 determines that the mode changing operation has been performed in step S439, it ends the still image shooting mode.

<MENU Screen, Function Registering Screen, and Function Rearranging Screen>

A description is now given of the aforementioned menu setting changing processing in step S429. FIGS. 5A-a to 5A-d and 5B-a to 5B-d show examples of screens that are displayed on the display unit 28 or the viewfinder 29 in the MENU setting changing processing. When the MENU button 76 is pressed, a MENU screen 500 is displayed. When the up or down button 78 is operated while the MENU screen 500 is displayed, a selection frame 501 moves. When the SET button is pressed, a function (processing) designated by the selection frame 501 is executed.

For example, when the SET button 77 is pressed while the selection frame 501 is on "register sub electronic dial functions," a function registering screen 520 shown in FIGS. 5B-a to 5B-d is displayed, and processing for registering sub electronic dial functions (FIGS. 7A and 7B) is executed. On the other hand, when the SET button 77 is pressed while the selection frame 501 is on "set rearrangement of sub electronic dial functions," a function rearrangement setting screen 560 is displayed, and processing for rearranging sub electronic dial functions (FIG. 8) is executed.

<Operations on MENU Screen>

Figure 6:
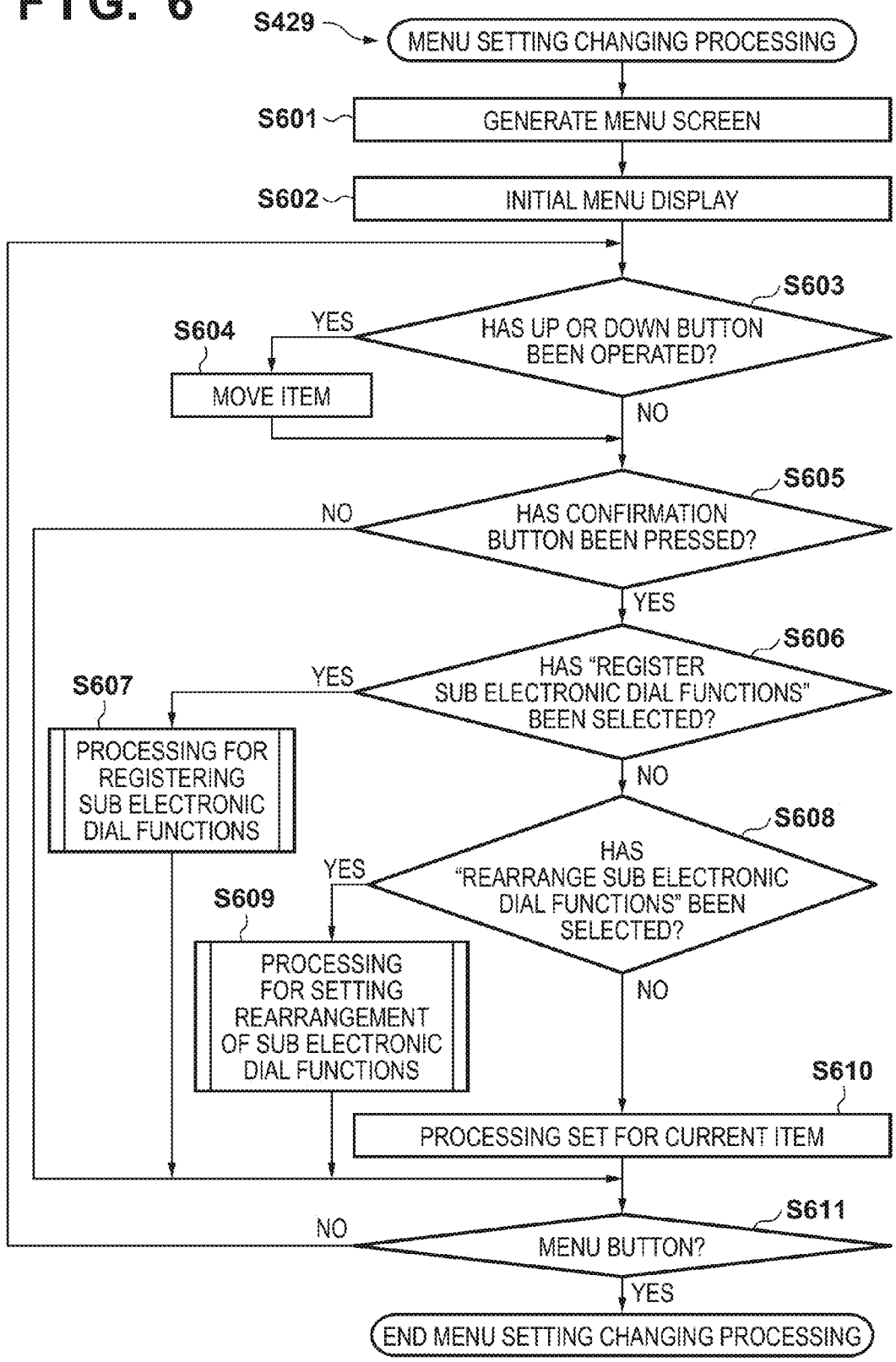
FIG. 6 is a flowchart showing MENU setting changing processing.

A description is now given of menu operations performed on the MENU screen 500 with reference to FIG. 6. The steps shown in FIG. 6 are realized by the system control unit 50 deploying programs stored in the nonvolatile memory 56 and the like to the system memory 52 and executing the deployed programs.

In step S601, the system control unit 50 generates the MENU screen, and sets an item that is currently selected (hereinafter, "current item"). In step S602, the system control unit 50 transfers the menu screen generated in step S601 to the memory 32, and displays the same on the display unit 28. This process displays the MENU screen 500 together with the selection frame 501 indicating the current item.

In step S603, the system control unit 50 determines whether the up or down button 78 of the operation unit 70 has been operated. If the system control unit 50 determines that the up or down button 78 has been operated, it moves the item selection in the direction of the operation that was performed in step S603 in step S604. In the present embodiment, the selection frame 501 moves in the up-down direction in accordance with the operation performed on the up or down button 78. If it is determined that the up or down button 78 has not been operated in step S603, step S604 is skipped.

In step S605, the system control unit 50 determines whether a button that is allocated to confirm an operation performed on the operation unit 70 (a confirmation button) has been operated. In the present embodiment, for example, the SET button 77 is used as the confirmation button. If the system control unit 50 determines that the confirmation button has been operated, it determines whether the current item that was set when the confirmation button was operated is "register sub electronic dial functions" in step S606. If the current item that was set when the confirmation button was operated is "register sub electronic dial functions" (FIG. 5A-a), the system control unit 50 executes processing for setting registration of sub electronic dial functions, which will be described with reference to the flowcharts of FIGS. 7A and 7B, in step S607.

If the system control unit 50 determines that the current item that was set when the confirmation button was operated is not "register sub electronic dial functions" in step S606, it determines whether the current item that was set when the confirmation button was operated is "set rearrangement of sub electronic dial functions" in step S608. If the current item is "set rearrangement of sub electronic dial functions" (FIG. 5A-b), the system control unit 50 executes processing for setting rearrangement of sub electronic dial functions in step S609. The processing for setting rearrangement of sub electronic dial functions will be described later with reference to a flowchart of FIG. 8.

If the system control unit 50 determines that the current item is not "set rearrangement of sub electronic dial functions" in step S608, it executes processing corresponding to the current item that is other than the aforementioned items in step S610. In step S611, the system control unit 50 determines whether the MENU button 76 of the operation unit 70 has been operated. If the MENU button 76 has been operated, the menu setting changing processing of step S429 of FIG. 4C is ended. If the MENU button 76 has not been operated, the system control unit 50 repeats the processes of step S603 and subsequent steps. In this way, the menu setting changing processing that uses the MENU screen continues.

<Operations on Function Registering Screen>

Figure 7A:
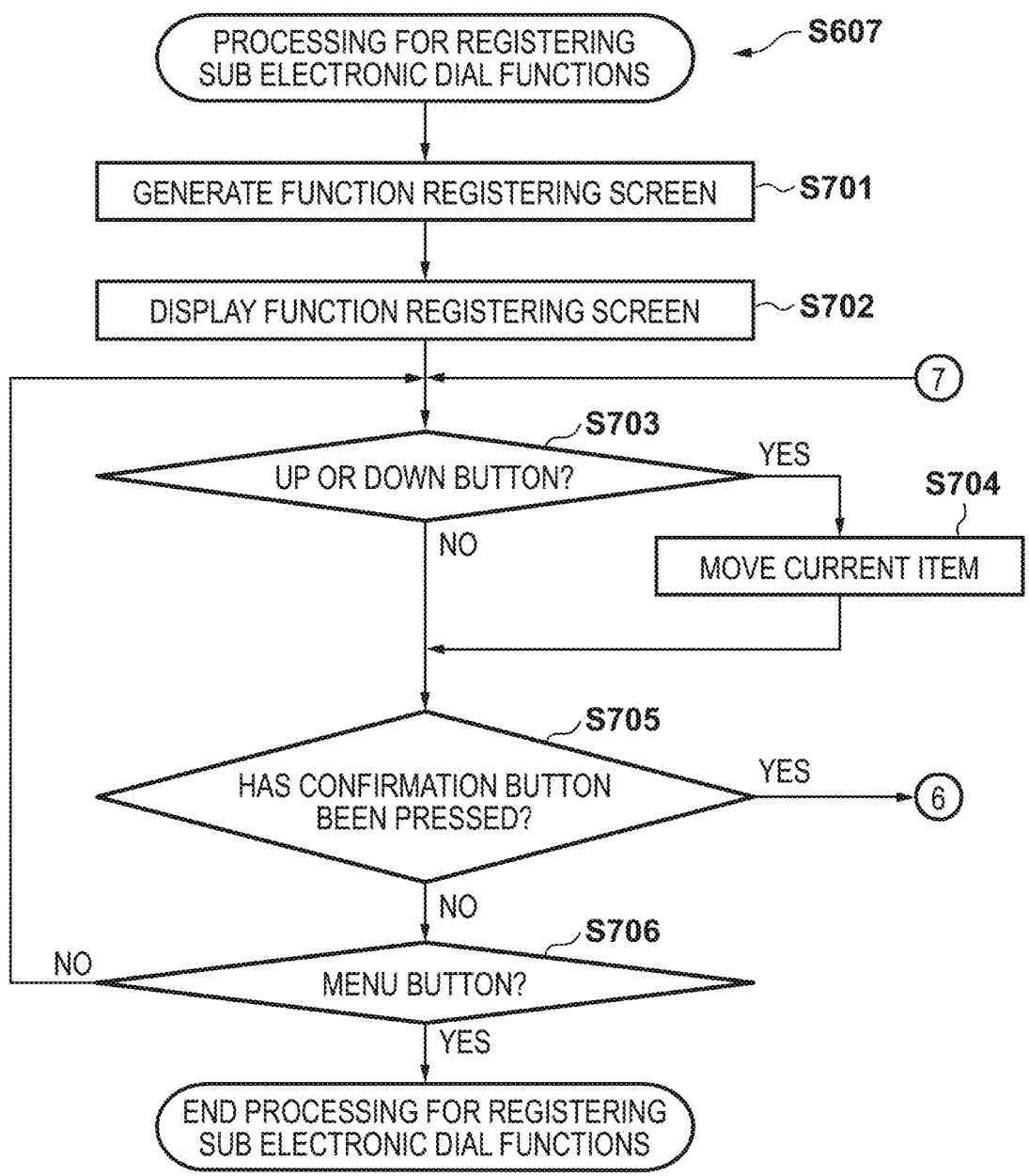

Using FIGS. 7A and 7B, the following describes the processing for setting registration of sub electronic dial functions. The steps shown in FIGS. 7A and 7B are realized by, for example, the system control unit 50 deploying programs stored in the nonvolatile memory 56 and the like to the system memory 52 and executing the deployed programs.

In step S701 of FIG. 7A, the system control unit 50 generates the function registering screen for setting registration of sub electronic dial functions. The system control unit 50 reads out, from the system memory 52, the standard function of the sub electronic dial 74 and setting information related to allocation of functions that are switchable in response to pressing of the DialFunc button 75, and lists them as setting items. Note that an item that is currently set as an item to be allocated is provided with a check mark. Then, in step S702, the system control unit 50 transfers the function registering screen generated in step S701 to the memory 32, and displays the same on the display unit 28 or the viewfinder 29. As shown in FIGS. 5B-a to 5B-d, a function item that is currently set as an item to be allocated is displayed with a check mark on the left of its name. When such a function item is no longer set as an item to be allocated as a result of later-described processing, the check mark next to its name is hidden. When, for example, the invalid function is set as the standard function and the photometric mode and white balance are registered as function items to be allocated, the foregoing processes of steps S701 and S702 display the function registering screen 520 shown in FIG. 5B-d.

In step S703, the system control unit 50 determines whether the up or down button 78 of the operation unit 70 has been operated. If the system control unit 50 determines that the up or down button 78 has been operated, it moves a selection frame 521 indicating the item selection in the direction of the operation that was performed in step S703 in step S704. If it is determined that the up or down button 78 has not been operated in step S703, step S704 is skipped.

In step S705, the system control unit 50 determines whether the button that is allocated to confirm an operation performed on the operation unit 70 (hereinafter, "confirmation button") has been operated. In the present embodiment, for example, the SET button 77 is used as the confirmation button. If the system control unit 50 determines that the confirmation button has not been operated, it determines whether the MENU button 76 of the operation unit 70 has been operated in step S706. If the system control unit 50 determines that the MENU button 76 has been operated, it ends the screen for setting registration of sub electronic dial functions, and returns to a screen that immediately precedes the transition to the screen for setting registration of sub electronic dial functions (the MENU screen that has been described using the flowchart of FIG. 6). If the system control unit 50 determines that the MENU button 76 has not been operated in step S706, it repeats the processes of step S703 and subsequent steps.

If the system control unit 50 determines that the confirmation button has been operated in step S705, it determines whether the current item is the invalid function, a function item other than the invalid function, or a shooting mode selection item in step S707 of FIG. 7B. The shooting mode selection item enables selection of a shooting mode in which allocation to the sub electronic dial 74 is to be changed. In the present embodiment, function items can be registered with respect to a manual mode (M mode), diaphragm priority/shutter speed priority/program AE modes (Av/Tv/P), and a manual moving image mode (M moving image mode). The M moving image mode is a moving image shooting mode in which the user can set a shutter speed and an f-number. The function items other than the invalid function include, for example, Av, Tv, an ISO film speed, white balance, an AF method, and a drive mode.

If the current item is a function item other than the invalid function, the system control unit 50 determines whether the current item has already been allocated as a sub electronic dial function in step S708. If the current item has not been allocated, the system control unit 50 places the current item in an allocated state and stores the allocated state of the current item to the system memory 52 in step S709. If the current item has already been allocated, the system control unit 50 cancels the allocated state of the current item and stores the cancelled state of the current item to the system memory 52 in step S710.

After the process of step S709 or S710, the system control unit 50 determines whether one or more functions other than the invalid function have been allocated as sub electronic dial functions in step S711. If the system control unit 50 determines that no function has been allocated other than the invalid function in step S711, it places the invalid function in a forcedly allocated state (cancellation cannot be made by performing an operation on the invalid function), and sets the invalid function as the standard function in step S714. Forcedly allocating the invalid function as a sub electronic dial function in this manner is referred to as forced allocation of the invalid function.

If the system control unit 50 determines that one or more functions other than the invalid function have been allocated in step S711, it determines whether the invalid function is in the forcedly allocated state in step S712. If the invalid function is not in the forcedly allocated state, the system control unit 50 continues the screen for setting registration of sub electronic dial functions by repeating the processes of step S703 and subsequent steps. If the invalid function is in the forcedly allocated state, the system control unit 50 cancels the forcedly allocated state of the invalid function and places the invalid function in an unallocated state in step S713. The system control unit 50 also sets the topmost item on the function registering screen among the allocated functions other than the invalid function as the standard function. Thereafter, the system control unit 50 continues the screen for setting registration of sub electronic dial functions by repeating the processes of step S703 and subsequent steps.

As described above, the processes of steps S708 to S714 control the allocated states of function items other than the invalid function. For example, when the confirmation button is pressed in the state of FIG. 5B-c, a function item corresponding to the ISO film speed is newly allocated as a function of the sub electronic dial 74. As a result, the function item corresponding to the ISO film speed becomes the topmost item on the function registering screen, and is thus set as the standard function. On the other hand, when the confirmation button is pressed in the state of FIG. 5B-a, the allocated state of the function item corresponding to the ISO film speed is cancelled. As a result, none of function items other than the invalid function is in the allocated state, and thus the invalid function is forcedly allocated as shown in FIG. 5B-b.

If the current item is a shooting mode selection item 522 in step S707, the system control unit 50 determines whether the left or right button 79 has been operated on the shooting mode selection item in step S715. If the system control unit 50 determines that the left or right button 79 has not been operated, it continues the screen for setting registration of sub electronic dial functions by repeating the processes of step S703 and subsequent steps. If the system control unit 50 determines that the left or right button has been operated in step S715, it switches to a storage area for the corresponding shooting mode, that is, the M mode, the Av/Tv/P modes, or the M moving image mode, on the system memory 52 in step S716. This is because allocatable functions vary among the M mode, the Av/Tv/P modes, and the M moving image mode.

If the current item is the invalid function in step S707, the system control unit 50 determines whether the invalid function has been forcedly allocated in step S717. If the invalid function has not been forcedly allocated, the system control unit 50 determines the allocated state of the invalid function in step S718. If the invalid function has not been allocated, the system control unit 50 places the invalid function in the allocated state in step S719, and stores the invalid function as the standard function to the system memory 52 in step S720. Thereafter, the system control unit 50 continues the screen for setting registration of sub electronic dial functions by repeating the processes of step S703 and subsequent steps. If the invalid function has already been allocated in step S718, the system control unit 50 cancels the allocated state of the invalid function in step S721. Then, in step S722, the system control unit 50 stores the topmost item among the allocated functions other than the invalid function as the standard function to the system memory 52. Thereafter, the system control unit 50 continues the screen for setting registration of sub electronic dial functions by repeating the processes of step S703 and subsequent steps.

If the system control unit 50 determines that the invalid function is in the forcedly allocated state in step S717, it displays a message indicating that the invalid function is in the forcedly allocated state and thus the allocated function cannot be cancelled in step S723. This message may disappear when a predetermined period has elapsed or when some form of user operation is performed.

As described above, in the processing for registering sub electronic dial functions, when no function is allocated to the sub electronic dial 74 as a result of cancelling allocation of items other than the invalid function completely, the invalid function is placed in the forcedly allocated state. This forcedly allocated state of the invalid function is not cancelled until a function item other than the invalid function is set. Furthermore, as will be described later, the invalid function is always arranged at the top; when the invalid function is validated, the invalid function is always set as the standard function even if another function item has been set as the standard function.

<Operations on Function Rearrangement Setting Screen>

Figure 8:
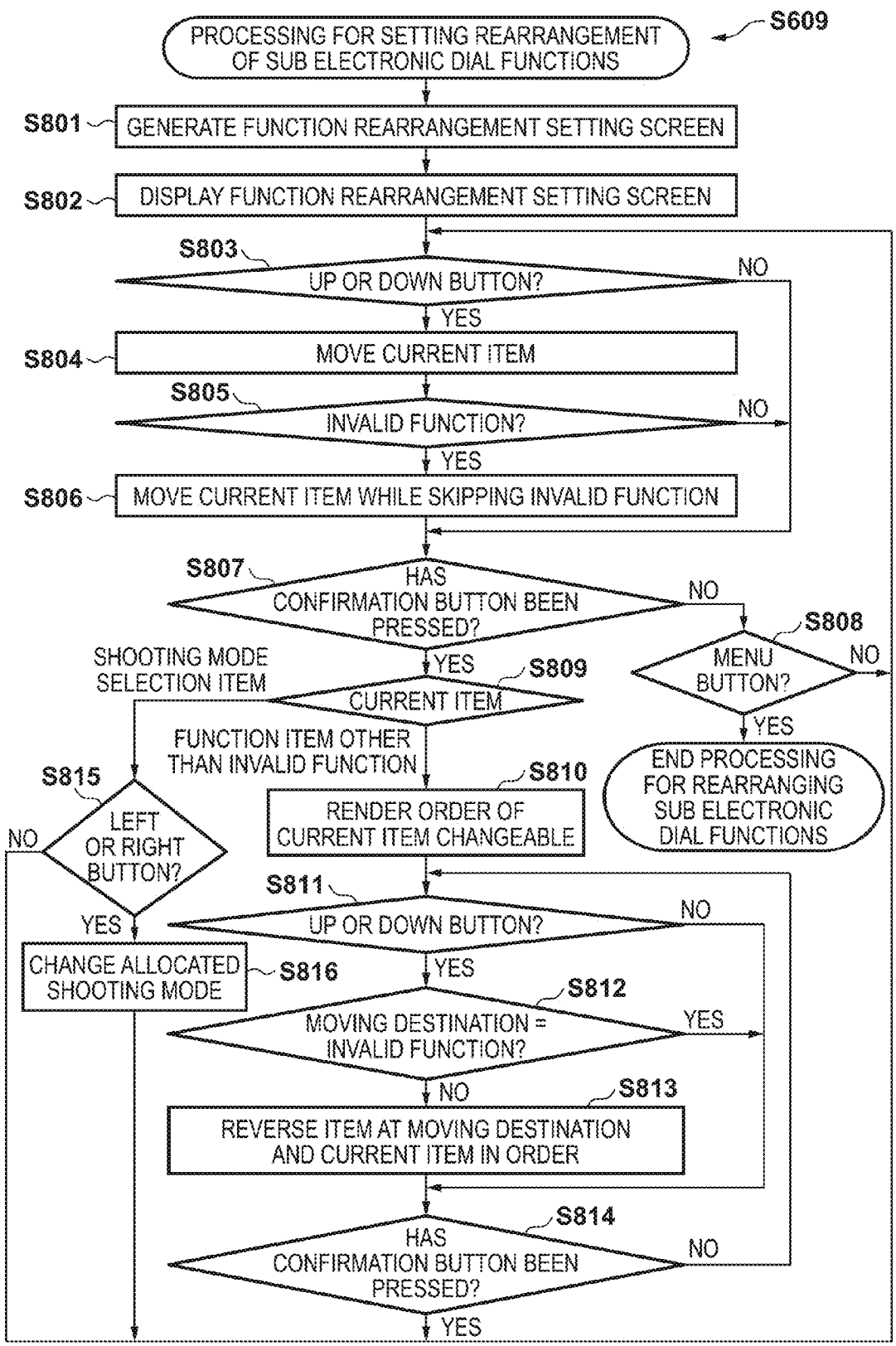
FIG. 8 is a flowchart showing function rearranging processing.

Using FIG. 8, the following describes the processing for setting rearrangement of sub electronic dial functions. The steps shown in FIG. 8 are realized by, for example, the system control unit 50 deploying programs stored in the nonvolatile memory 56 and the like to the system memory 52 and executing the deployed programs.

In step S801, the system control unit 50 generates the function rearrangement setting screen for the sub electronic dial 74. In step S802, the system control unit 50 reads out, from the system memory 52, the standard function of the sub electronic dial 74 and setting information related to allocation of functions that are switchable in response to pressing of the DialFunc button 75, and lists them as setting items. Note that an item that is currently set as an item to be allocated is provided with a check mark. Then, the system control unit 50 transfers the function rearrangement setting screen generated in step S801 to the memory 32, and displays the same on the display unit 28. FIGS. 5A-c and 5A-d show examples of the displayed function rearrangement setting screen.

In step S803, the system control unit 50 determines whether the up or down button 78 of the operation unit 70 has been operated. If the system control unit 50 determines that the up or down button 78 has been operated, it moves the selection frame 561 in the direction of the operation that was performed in step S803 (upward or downward) in step S804. An item designated by the selection frame 561 is in a selected state (a current item). In step S805, the system control unit 50 determines whether the destination of the movement in step S804 is the invalid function. If the system control unit 50 determines that the destination is the invalid function in step S805, it skips the invalid function and designates the next function item as the current item in step S806. In the present embodiment, changing of the order of the invalid function is not permitted because the invalid function is fixed as the standard function. Therefore, the present processing for changing the arrangement of function items prohibits the invalid function from serving as the current item, and designates a function item that follows the invalid function as the current item. When the invalid function is skipped in the foregoing manner, a message indicating that the order of the invalid function cannot be changed may be displayed. If it is determined that the current item is not the invalid function in step S805, step S806 is skipped.

Next, in step S807, the system control unit 50 determines whether the confirmation button that is allocated to confirm an operation performed on the operation unit 70 (e.g., the SET button 77) has been operated. If the system control unit 50 determines that the confirmation button has not been operated, it determines whether the MENU button 76 of the operation unit 70 has been operated in step S808. If the system control unit 50 determines that the MENU button has been operated, it ends the function rearrangement setting screen for the sub electronic dial, and displays a screen that immediately precedes the transition to the function rearrangement setting screen again. If the system control unit 50 determines that the MENU button 76 has not been operated, it continues the processing for rearranging sub electronic dial functions by repeating the processes of step S803 and subsequent steps.

If the system control unit 50 determines that the confirmation button has been operated in step S807, it determines whether the current item is an item for selecting a shooting mode in which allocation to the sub electronic dial 74 is to be changed or a function item in step S809. Examples of selectable items corresponding to shooting modes include the M mode, the Av/Tv/P modes, and the M moving image mode. Examples of function items include Av or Tv, the ISO film speed, white balance, the AF method, and the drive mode.

If the current item is a function item, the system control unit 50 renders the order of the current item changeable in step S810. In step S811, the system control unit 50 determines whether the up or down button 78 has been operated. If the system control unit 50 determines that the up or down button 78 has been operated, it determines whether a function item at the destination of the button operation that was detected in step S811 is the invalid function in step S812. If the function item at the destination of the button operation is a function item other than the invalid function, the system control unit 50 changes the order by reversing the function item at the destination of the button operation and the current item in step S813. On the other hand, if it is determined that the function item at the destination of the button operation is the invalid function in step S812, step S813 is skipped. This control prevents changing of the order of the invalid function.

For example, pressing the confirmation button on the function rearrangement setting screen 560 shown in FIG. 5A-c renders the order of a function item corresponding to the photometric mode changeable. When the down button is pressed in this state, a function item corresponding to the drive mode and the function item corresponding to the photometric mode are reversed in order as shown in FIG. 5A-d. Note that when the up button is pressed in the state of FIG. 5A-c, the moving destination is the invalid function, and thus this operation is ignored. That is, when the invalid function is allocated, the invalid function is always arranged at the top (N=1). In the processes of steps S811 to S814, the destination to which the current item is moved by operating the up or down button will never be a shooting mode selection item 562.

Next, in step S814, the system control unit 50 determines whether the confirmation button has been operated. If the system control unit 50 determines that the confirmation button has been operated, it cancels the state that was set in step S810, that is, the state in which the order is changeable, and repeats the processes of step S803 and subsequent steps. In this way, the processing for setting rearrangement of sub electronic dial functions is continued. If the system control unit 50 determines that the confirmation button has not been operated, it continues the control for changing the order of the current item by repeating the processes of step S811 and subsequent steps.

If the current item is the shooting mode selection item 562 in step S809, the system control unit 50 determines whether the left or right button 79 has been operated on the shooting mode selection item in step S815. If the left or right button 79 has been operated, the system control unit 50 switches to a storage area for the corresponding shooting mode on the system memory 52 in step S816. This is because allocatable functions vary among the M mode, the Av/Tv/P modes, and the M moving image mode. On the other hand, if the left or right button has not been operated in step S815, the process of step S816 is skipped.

As described above, in setting rearrangement of sub electronic dial functions, the invalid function serves as a function for preventing accidental operations. Therefore, in switching among functions using the DialFunc button 75, arranging the invalid function in the middle has little meaning and reduces usability. For this reason, in setting rearrangement of sub electronic dial functions, the invalid function is fixed at the top.

Although the invalid function or an arbitrary function item can be set as the standard function in the foregoing embodiment, the invalid function may be fixed as the standard function. In this case, the user can designate desired function items corresponding to the function numbers N of two and up, and the order thereof.

Note that various types of control performed by the system control unit 50 in the foregoing embodiment may be performed by one item of hardware, or a plurality of items of hardware may share processing for controlling the entire apparatus.

Although the present invention has been described in detail based on its preferred embodiment, the present invention is not limited to this specific embodiment, and encompasses various embodiments that fall within the scope of the principles of the present invention. Furthermore, the foregoing embodiment merely illustrates one of various embodiments of the present invention, and the various embodiments can be combined as appropriate.

Although the foregoing embodiment has provided an example in which the present invention is applied to a digital camera, which is an image capturing apparatus, the present invention is not limited to this example. The present invention is applicable to any electronic device including a second operation member that switches sequentially among function items to be set, and a first operation member that changes a set value of a function item that has been designated by the switching performed by the second operation member. That is, the present invention is applicable to a personal computer, a PDA, a mobile telephone terminal, a mobile image viewer, a printer, a digital picture frame, a music player, a game console, an electronic book reader, and the like. The present invention is also applicable to a tablet terminal provided with a plurality of operation members, a smartphone provided with a plurality of operation members, a projection apparatus, a home electronic apparatus, an onboard apparatus, a medical apparatus, and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-170063, filed Aug. 31, 2016 and 2016-169619, filed Aug. 31, 2016, which are hereby incorporated by reference herein in their entirety.

What is claimed is:

1. An electronic device, comprising:
a first operation member configured to change a set value of an allocated function item;
a second operation member configured to change a function item allocated to the first operation member;
a registering unit configured to register a set of function items to be allocated to the first operation member, the set including a standard function that is allocated to the first operation member before the second operation member is operated; and
a control unit configured to control switching among function items to be allocated to the first operation member based on whether the standard function is an invalid function and on the number of function items included in the registered set, the switching being performed in response to an operation performed on the second operation member, the invalid function disabling changing of the set value by the first operation member.

2. The electronic device according to claim 1, wherein
in a case in which the standard function is the invalid function,
when the registered set includes only the standard function and another function item, the control unit performs control to switch a function allocated to the first operation member alternately between the standard function and the another function item in response to an operation performed on the second operation member, and
when the registered set includes the standard function and two or more other function items, the control unit performs control to switch a function allocated to the first operation member sequentially among the two or more function items, from one function item to another, in response to an operation performed on the second operation member.

3. The electronic device according to claim 1, wherein
the control unit changes a function item allocated to the first operation member back to the standard function when a state in which none of the operation members is operated continues for a certain period after the second operation member or the first operation member is operated.

4. The electronic device according to claim 1, wherein
the registering unit is capable of registering an arbitrary function item as the standard function.

5. The electronic device according to claim 1, wherein
when the registered set includes the standard function and one or more other function items and the standard function is a function item whose set value is changeable using the first operation member, the control unit performs control to switch sequentially among the one or more function items and the standard function, from one item/function to another, in response to an operation performed on the second operation member.

6. The electronic device according to claim 1, further comprising
a shutter button for issuing an instruction to start shooting, wherein
the first operation member and the second operation member are arranged at the same height or on the same surface as the shutter button.

7. The electronic device according to claim 1, further comprising
a display control unit configured to display, on a display unit, a first guide showing a state of a set value that has been configured in response to an operation performed on the first operation member, and a second guide showing states of function items that are to be set to the first operation member in response to an operation performed on the second operation member, wherein
the first guide displays a plurality of set value candidates that are lined up in a first direction corresponding to a direction in which the first operation member is operable, and
the second guide displays a plurality of functions that are allocatable to the first operation member, the displayed plurality of functions being lined up in a second direction that corresponds to a direction in which the second operation member is operable and that is perpendicular to the first direction.

8. The electronic device according to claim 7, further comprising
a viewfinder configured to enable confirmation of a shooting state, wherein
the display unit is provided inside the viewfinder.

9. The electronic device according to claim 1, wherein
the second operation member is a push button, and the first operation member is a rotatable operation member that is arranged around the push button.

10. An electronic device, comprising:
a first operation member configured to change a set value of an allocated function item;
a second operation member configured to change a function item allocated to the first operation member;
a registering unit configured to register a set of function items to be allocated to the first operation member, the set including an invalid function as a function that is allocated to the first operation member before the second operation member is operated, the invalid function disabling changing of the set value by the first operation member; and
a control unit configured to perform control to
when the registered set includes only the invalid function and another function item, switch a function allocated to the first operation member alternately between the invalid function and the another function item in response to an operation performed on the second operation member, and
when the registered set includes the invalid function and two or more other function items, switch a function allocated to the first operation member sequentially among the two or more function items, from one function item to another, in response to an operation performed on the second operation member.

11. A method of controlling an electronic device including a first operation member configured to change a set value of an allocated function item, and a second operation member configured to change a function item allocated to the first operation member, the method comprising:
registering a set of function items to be allocated to the first operation member, the set including a standard function that is allocated to the first operation member before the second operation member is operated; and
controlling a way of switching among function items to be allocated to the first operation member based on whether the standard function is an invalid function and on the number of function items included in the registered set, the switching being performed in response to an operation performed on the second operation member, the invalid function disabling changing of the set value by the first operation member.

12. A method of controlling an electronic device including a first operation member configured to change a set value of an allocated function item, and a second operation member configured to change a function item allocated to the first operation member, the method comprising:
registering a set of function items to be allocated to the first operation member, the set including an invalid function as a function that is allocated to the first operation member before the second operation member is operated, the invalid function disabling changing of the set value by the first operation member; and
performing control to
when the registered set includes only the invalid function and another function item, switch a function allocated to the first operation member alternately between the invalid function and the another function item in response to an operation performed on the second operation member, and
when the registered set includes the invalid function and two or more other function items, switch a function allocated to the first operation member sequentially among the two or more function items, from one function item to another, in response to an operation performed on the second operation member.

13. A non-transitory computer readable storage medium having stored therein a program for causing a computer to execute a method of controlling an electronic device including a first operation member and a second operation member, the first operation member being configured to change a set value of an allocated function item, the second operation member being configured to change a function item allocated to the first operation member, the method comprising:
registering a set of function items to be allocated to the first operation member, the set including a standard function that is allocated to the first operation member before the second operation member is operated; and
controlling a way of switching among function items to be allocated to the first operation member based on whether the standard function is an invalid function and on the number of function items included in the registered set, the switching being performed in response to an operation performed on the second operation member, the invalid function disabling changing of the set value by the first operation member.

14. A non-transitory computer readable storage medium having stored therein a program for causing a computer to execute a method of controlling an electronic device including a first operation member and a second operation member, the first operation member being configured to change a set value of an allocated function item, the second operation member being configured to change a function item allocated to the first operation member, the method comprising:
registering a set of function items to be allocated to the first operation member, the set including an invalid function as a function that is allocated to the first operation member before the second operation member is operated, the invalid function disabling changing of the set value by the first operation member; and
performing control to
when the registered set includes only the invalid function and another function item, switch a function allocated to the first operation member alternately between the invalid function and the another function item in response to an operation performed on the second operation member, and
when the registered set includes the invalid function and two or more other function items, switch a function allocated to the first operation member sequentially among the two or more function items, from one function item to another, in response to an operation performed on the second operation member.

15. An electronic device, comprising:
a first operation member;
a second operation member;
a registering unit configured to be able to
register one of a plurality of functions or an invalid function as a standard function of the first operation member in response to a user operation, and
register at least one of the plurality of functions as a temporary function of the first operation member in response to a user operation; and
a control unit configured to
when the first operation member has been operated before the second operation member is operated, if a function other than the invalid function is registered as the standard function, perform control to execute the function registered as the standard function, whereas if the invalid function is registered as the standard function, perform control to execute no function in response to the operation performed on the first operation member, and
when the first operation member has been operated after the second operation member is operated, perform control to execute a function registered as the temporary function.

16. The electronic device according to claim 15, wherein the registering unit is not capable of registering a plurality of functions as the standard function, and is capable of registering a plurality of functions as the temporary functions.

17. The electronic device according to claim 15, wherein after the second operation member is operated, the control unit performs control that is not based on the temporary function but is based on the standard function when the first operation member is operated following an elapse of a certain period or following an operation performed on a third operation member.

18. The electronic device according to claim 17, wherein the third operation member is a shutter button that is capable of instructing an image capturing unit to perform shooting.

19. The electronic device according to claim 15, further comprising:

an image capturing unit;
an eyepiece viewfinder; and
a shutter button, wherein
the first operation member and the second operation member are arranged so as to be closer to the shutter button than to the eyepiece viewfinder.

20. The electronic device according to claim 19, wherein the first operation member and the second operation member are positioned so as to be operable using fingers that belong to the same hand as a finger that operates the shutter button.

21. The electronic device according to claim 15, wherein when a registering screen that is intended for registration by the registering unit is operated so as to register none of the plurality of functions as the standard function and the temporary function of the first operation member, the invalid function is registered as the standard function.

22. The electronic device according to claim 15, wherein when the registering unit has registered a plurality of functions as the temporary functions, the plurality of functions registered as the temporary functions are rearrangeable by a user operation, and each operation performed on the second operation member switches among the plurality of functions to be allocated to the first operation member in the rearranged order.

23. The electronic device according to claim 15, wherein when the invalid function is registered as the standard function and a plurality of functions are registered as the temporary functions, the control unit performs control to, each time the second operation member is operated, allocate one of the plurality of functions registered as the temporary functions, excluding the standard function, to the first operation member sequentially, and
when the invalid function is registered as the standard function and one function is registered as the temporary function, the control unit performs control to, each time the second operation member is operated, allocate the invalid function registered as the standard function and the function registered as the temporary function to the first operation member alternately.

24. The electronic device according to claim 23, wherein when a function other than the invalid function is registered as the standard function and a plurality of functions are registered as the temporary functions, the control unit performs control to, each time the second operation member is operated, allocate one of the standard function and the plurality of functions registered as the temporary functions to the first operation member sequentially.

25. The electronic device according to claim 15, wherein functions that are registrable by the registering unit are setting items whose set values are to be changed in response to an operation performed on the first operation member,
when the first operation member has been operated before the second operation member is operated, if a setting item other than the invalid function is registered as the standard function, the control unit performs control to change a set value of the setting item registered as the standard function, whereas if the invalid function is registered as the standard function, the control unit performs control to change none of the set values of the setting items, and
when the first operation member has been operated after the second operation member is operated, the control unit performs control to change a set value of a setting item registered as the temporary function.

26. The electronic device according to claim 15, wherein the second operation member is a push button, and the first operation member is a rotatable operation member that is arranged around the push button.

27. The electronic device according to claim 15, further comprising
a display control unit configured to display, on a display unit, a first guide showing a state of a set value that has been configured in response to an operation performed on the first operation member, and a second guide showing states of functions that are to be allocated to the first operation member in response to an operation performed on the second operation member, wherein
the first guide displays a plurality of set value candidates that are lined up in a first direction corresponding to a direction in which the first operation member is operable, and
the second guide displays the plurality of functions that are allocatable to the first operation member, the displayed plurality of functions being lined up in a second direction that corresponds to a direction in which the second operation member is operable and that is perpendicular to the first direction.

28. A method of controlling an electronic device including a first operation member and a second operation member, the method comprising:
registering one of a plurality of functions or an invalid function as a standard function of the first operation member in response to a user operation;
registering at least one of the plurality of functions as a temporary function of the first operation member in response to a user operation;
when the first operation member has been operated before the second operation member is operated, if a function other than the invalid function is registered as the standard function, executing the function registered as the standard function, whereas if the invalid function is registered as the standard function, executing no function in response to the operation performed on the first operation member; and
when the first operation member has been operated after the second operation member is operated, executing a function registered as the temporary function.

29. A non-transitory computer readable storage medium having stored therein a program for causing a computer to execute a method of controlling an electronic device including a first operation member and a second operation member, the method comprising:
registering one of a plurality of functions or an invalid function as a standard function of the first operation member in response to a user operation;
registering at least one of the plurality of functions as a temporary function of the first operation member in response to a user operation;
when the first operation member has been operated before the second operation member is operated, if a function other than the invalid function is registered as the standard function, executing the function registered as the standard function, whereas if the invalid function is registered as the standard function, executing no function in response to the operation performed on the first operation member; and when the first operation member has been operated after the second operation member is operated, executing a function registered as the temporary function.

\* \* \* \* \*